(12) United States Patent
Park et al.

(10) Patent No.: US 12,232,172 B2
(45) Date of Patent: *Feb. 18, 2025

(54) CHANNEL ACCESS FOR WIRELESS COMMUNICATION

(71) Applicant: Comcast Cable Communications, LLC, Philadelphia, PA (US)

(72) Inventors: Jonghyun Park, Syosset, NY (US); Esmael Hejazi Dinan, McLean, VA (US); Hyoungsuk Jeon, Centreville, VA (US); Hua Zhou, Vienna, VA (US); Yunjung Yi, Vienna, VA (US); Ali Cagatay Cirik, Chantilly, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/470,071

(22) Filed: Sep. 19, 2023

(65) Prior Publication Data
US 2024/0057162 A1 Feb. 15, 2024

Related U.S. Application Data

(63) Continuation of application No. 17/390,733, filed on Jul. 30, 2021, now Pat. No. 11,800,562.

(60) Provisional application No. 63/059,598, filed on Jul. 31, 2020.

(51) Int. Cl.
*H04W 74/08* (2024.01)
*H04L 5/00* (2006.01)
*H04W 16/28* (2009.01)
*H04W 74/0816* (2024.01)

(52) U.S. Cl.
CPC ....... *H04W 74/0816* (2013.01); *H04L 5/0051* (2013.01); *H04W 16/28* (2013.01)

(58) Field of Classification Search
CPC .......................... H04W 74/0816; H04W 16/28
See application file for complete search history.

(56) References Cited

U.S. PATENT DOCUMENTS

| | | | |
|---|---|---|---|
| 9,948,375 B2 | 4/2018 | Yu et al. | |
| 11,800,562 B2* | 10/2023 | Park | ................... H04W 74/0808 |
| 2020/0145079 A1 | 5/2020 | Marinier et al. | |
| 2020/0146058 A1 | 5/2020 | Xu et al. | |
| 2021/0050955 A1 | 2/2021 | Park et al. | |
| 2021/0185730 A1 | 6/2021 | Xue et al. | |
| 2022/0287093 A1 | 9/2022 | Iyer et al. | |
| 2023/0047505 A1* | 2/2023 | Zhang | ................... H04W 16/28 |

OTHER PUBLICATIONS

R1-1902790—3GPP TSG RAN WG1 #96; Athens, Greece, Feb. 25-Mar. 1, 2019; NTT Docomo, Inc. "Enhancements to initial access procedure for NR-U".

(Continued)

*Primary Examiner* — Derrick V Rose
(74) *Attorney, Agent, or Firm* — Banner & Witcoff, Ltd.

(57) ABSTRACT

A communication device may use a channel access procedure to determine channel availability for signal transmission. The communication device may select a channel access procedure, among a plurality of channel access procedures, based on a beam indication from a base station and a transmission beam to be used for the signal transmission.

44 Claims, 29 Drawing Sheets

(56) References Cited

OTHER PUBLICATIONS

R1-1803417—3GPP TSG RAN WG1 Meeting #92; Athens, Greece Feb. 26-Mar. 2, 2018; Ericsson "Feature lead summary 3 on beam measurement and reporting".
R1-1912671—3GPP TSG-RAN WG1 Meeting #99; Reno, USA, Nov. 18-22, 2019; Ericsson "Channel Strcture for Two-Step RACH".
R1-1809219—3GPP TSG RAN WG1 Meeting #94, Gothenburg, Sweden, Aug. 20-24, 2018; Xiaomi "Initial Access in NR Unlicensed".
Feb. 17, 2022—European Search Report—EP 21188771.6.
R1-2004520 3GPP TSG RAN WG1 Meeting #101, e-Meeting, May 25-Jun. 5, 2020, Source: CAICT, Title: Discussions on channel access mechanism on supporting NR from 52.6GHz to 71 GHZ.
R1-2004489 3GPP TSG RAN WG1 Meeting #101-e, e-Meeting, May 25-Jun. 5, 2020, Source: Qualcomm Incorporated, Title: Channel access mechanism for NR in 52.6 to 71GHz band.
R1-2004418 3GPP TSG RAN WG1 Meeting #101, e-Meeting, May 25-Jun. 5, 2020, Source: NTT Docomo, Inc., Title: Channel Access Mechanism for NR in 60 GHz unlicensed spectrum.
R1-2004303 3GPP TSG RAN WG1 Meeting #101, e-Meeting, May 25-Jun. 5, 2020, Source: Quectel, Title: Discussions on Channel Access Mechanism for NR from 52.6GHz to 71GHz.
R1-2004300 3GPP TSG RAN WG1 Meeting #101, e-Meeting, May 25-Jun. 5, 2020, Source: InterDigital Inc., Title: On Channel Access Mechanisms.
R1-2004288 3GPP TSG RAN WG1 Meeting #101, e-Meeting, May 25-Jun. 5, 2020, Source: AT&T, Title: Channel access mechanisms for NR from 52.6-71GHZ.
R1-2004248 3GPP TSG RAN WG1 Meeting #101-e, e-Meeting, May 25-Jun. 5, 2020, Source: Apple Inc., Title: On Unlicensed Channel Access Mechanisms for > 52.6GHz.
R1-2004097 3GPP TSG RAN WG1 Meeting #101-E, May 25-Jun. 5, 2020, Source: OPPO, Title: Discussion on channel access mechanism for above 52.6GHz.
R1-2004039 3GPP TSG RAN WG1 Meeting #101, e-Meeting, May 25-Jun. 5, 2020, Source: LG Electronics, Title: Considerations on channel access mechanism to support NR above 52.6 GHZ.
R1-2003962 3GPP TSG RAN WG1 Meeting #101, e-Meeting, May 25-Jun. 5, 2020, Source: CMCC, Title: Discussion on channel access mechanism for above 52.6GHz.
R1-2003904 3GPP TSG RAN WG1 Meeting #101, e-Meeting, May 25-Jun. 5, 2020, Source: Samsung, Title: Channel access mechanism for 60 GHz unlicensed spectrum.
R1-2003850 3GPP TSG RAN WG1 Meeting #101e, e-Meeting, May 25-Jun. 5, 2020, Source: Ericsson, Title: Channel Access Mechanism.
R1-2003812 3GPP TSG RAN WG1 Meeting #101-e, e-Meeting, May 25-Jun. 5, 2020, Source: Nokia, Nokia Shanghai Bell, Title: NR coexistence mechanisms for 60 GHz unlicensed band.
R1-2003780 3GPP TSG RAN WG1 Meeting #101-e, e-Meeting, May 25-Jun. 5, 2020, Source: Charter Communications, Title: Channel access mechanisms for 60GHz NR-U.
R1-2003765 3GPP TSG RAN WG1 Meeting #101, E-Meeting, May 25-Jun. 5, 2020, Source: Intel Corporation, Title: Channel Access Procedure for NR in 52.6-71 GHz.
R1-2003680 3GPP TSG RAN WG1 Meeting #101, e-Meeting, May 25-Jun. 5, 2020, Source: MediaTek Inc., Title: Channel access mechanism for NR from 52.6 GHz to 71 GHZ.
R1-2003637 3GPP TSG RAN WG1 Meeting #101, e-Meeting, May 25-Jun. 5, 2020, Source: CATT, Title: Channel Access Mechanism in support.
R1-2003462 3GPP TSG RAN WG1 Meeting #101, e-Meeting, May 25-Jun. 5, 2020, Source: ZTE, Sanechips, Title: Discussion on the channel access mechanism for above 52.6GHz.
R1-2003425 3GPP TSG RAN WG1 Meeting #101, e-Meeting, May 25-Jun. 5, 2020, Source: vivo, Title: Discussion on channel access mechanism.
R1-2003305 3GPP TSG RAN WG1 Meeting #101-e, E-Meeting, May 25-Jun. 5, 2020, Source: Lenovo, Motorola Mobility, Title: Discussion on channel access for NR beyond 52.6 GHZ.
R1-2003294 3GPP TSG RAN WG1 Meeting #101-e, E-Meeting, May 25-Jun. 5, 2020, Source: Huawei, HiSilicon, Title: Channel access mechanism for 60 GHz unlicensed operation.
R1-1911820 3GPP TSG RAN WG1 Meeting #99, Reno, USA, Nov. 18-22, 2019, Source: ZTE, Sanechips, Title: Remaining issues on DL reference signals and channels design for NR-U.
R1-1911722 3GPP TSG RAN WG1 Meeting #99, Reno, USA, Nov. 18-22, 2019, Source: Qualcomm Incorporated, Title: Summary of RRC parameters for NR-U up to RAN1.
R1-1812697 3GPP TSG RAN WG1 Meeting #95, Spokane, USA, Nov. 12-16, 2018, Source: Nokia, Nokia Shanghai Bell, Title: On the Frame structure and Wideband operation for NR-U.
R1-1812696 3GPP TSG RAN WG1 Meeting #95, Spokane, USA, Nov. 12-16, 2018, Source: Nokia, Nokia Shanghai Bell, Title: On DL Signals and Channels for NR-U.
R1-1812479 3GPP TSG RAN WG1 Meeting #95, Spokane, USA, Nov. 12-16, 2018, Source: Intel Corporation, Title: On the NR-unlicensed frame structure.
R1-1812353 3GPP TSG RAN WG1 Meeting #95, Spokane, USA, Nov. 12-16, 2018, Source: MediaTek Inc., Title: Frame Structure for NR-U operation.
R1- 1812191 3GPP TSG RAN WG1 Meeting #95, Spokane, USA, Nov. 12-16, 2018, Source: Huawei, HiSilicon, Title: NR numerology and frame structure for unlicensed bands.
R1-1713986 3GPP TSG RAN WG1 Meeting #90, Prague, Czech Republic, Aug. 21-25, 2017, Source: Ericsson, Title: On Channel Access Mechanisms for NR in Unlicensed Spectrum.
3GPP TS 38.331 V16.1.0 (Jul. 2020) 3rd Generation Partnership Project; Technical Specification Group Radio Access Network; NR; Radio Resorce Control (RRC) protocol specification (Release 16).
3GPP TS 38.321 V16.1.0 (Jul. 2020) 3rd Generation Partnership Project; Technical Specification Group Radio Access Network; NR; Medium Access Control (MAC) protocol specification (Release 16).
3GPP TS 38.214 V16.2.0 (Jun. 2020) 3rd Generation Partnership Project; Technical Specification Group Radio Access Network; NR; Physical layer procedures for data (Release 16).
3GPP TS 38.213 V16.2.0 (Jun. 2020) 3rd Generation Partnership Project; Technical Specification Group Radio Access Network; NR; Physical layer procedures for control (Release 16).
3GPP TS 38.212 V16.2.0 (Jun. 2020), 3rd Generation Partnership Project; Technical Specification Group Radio Access Network; NR; Multiplexing and channel coding (Release 16).
3GPP TS 38.211 V16.2.0 (Jun. 2020), Technical Specification, 3rd Generation Partnership Project; Technical Specification Group Radio Access Network; NR; Physical channels and modulation (Release 16).
3GPP TS 37.213 V16.2.0 (Jun. 2020), Technical Specification, 3rd Generation Partnership Project; Technical Specification Group Radio Access Network; Physical layer procedures for shared spectrum channel access (Release 16).
R1-1813221 3GPP TSG RAN WG1 Meeting #95, Spokane USA, Nov. 12-16, 2018, Source: InterDigital Inc., Title: Discussion on Procedures for Initial Access and Mobility in NR-U.
R1-1803780 3GPP TSG RAN WG1 Meeting #92bis, Sanya, China, Apr. 16-20, 2018, Source: CATT, Title: Physical Layer Procedures for NR Unlicensed Operations.
R1-2004000 3GPP TSG RAN WG1 Meeting #101-e, e-Meeting, May 25-Jun. 5, 2020, Source: Spreadtrum Communications, Title: Remaining issues on initial access signals.
R1-1911098 3GPP TSG RAN WG1 Meeting #98bis, Chongqing, China, Oct. 14-20, 2019, Source: Qualcomm Incorporated, Title: Initial access and mobility procedures for NR unlicensed.
R1-1912010 3GPP TSG RAN WG1 Meeting #99-e, Reno USA, Nov. 18-22, 2019, Source: VIVO, Title: Discussion on physical DL channel design in unlicensed spectrum.
Jul. 15, 2022—EP Search Report—EP App. No. 21188771.6.

* cited by examiner

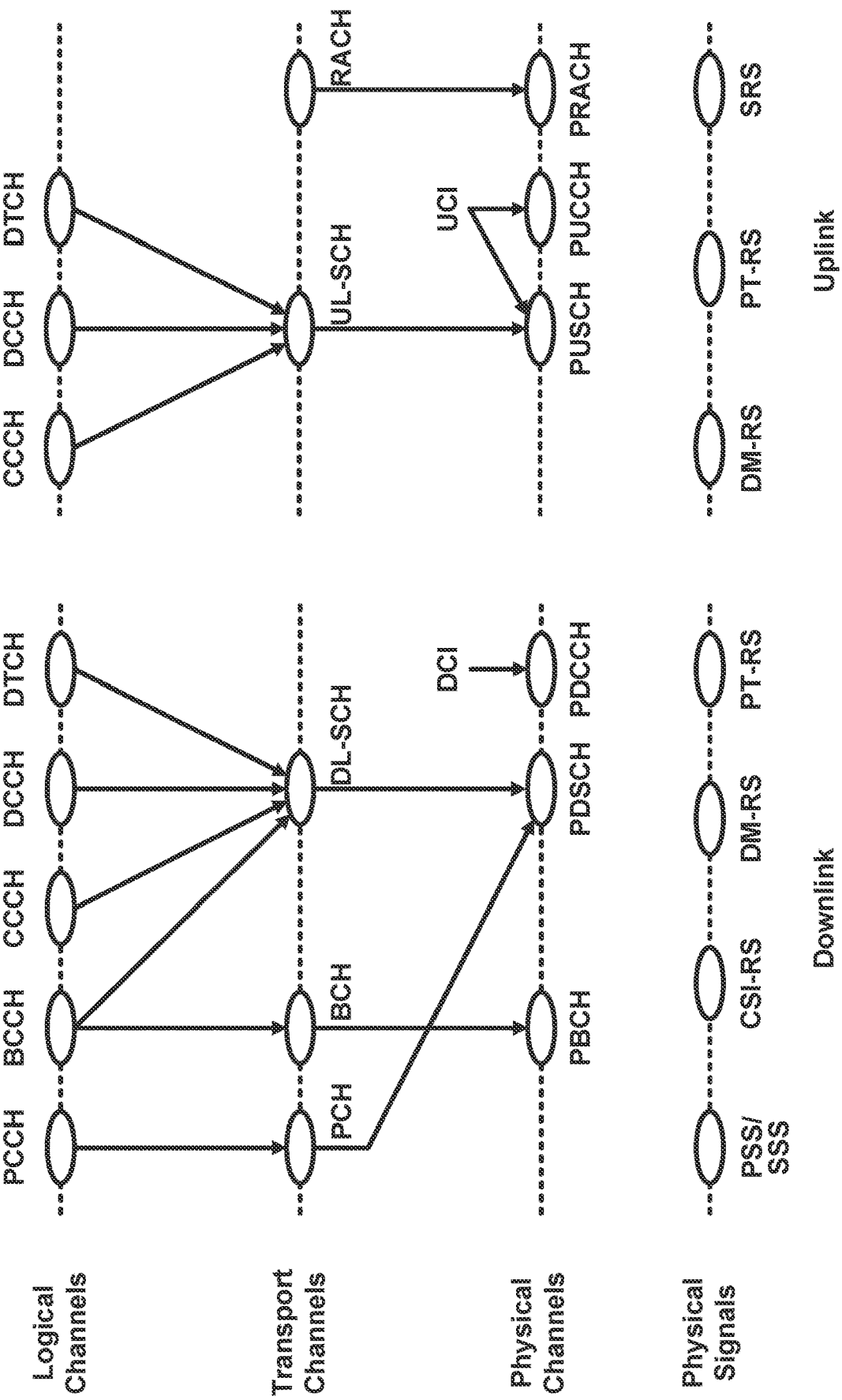

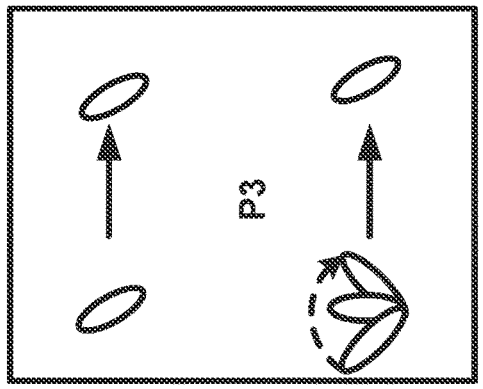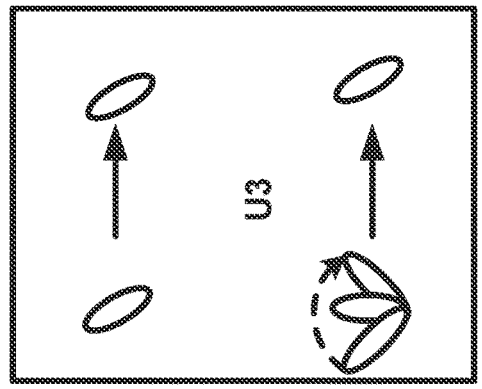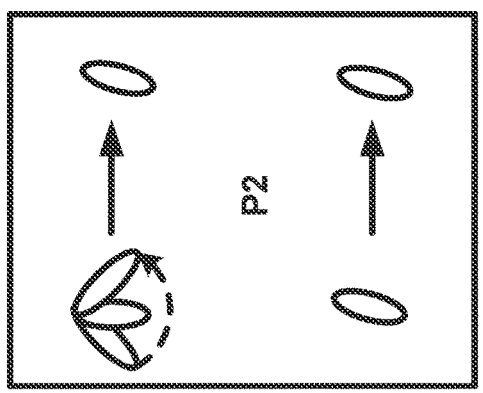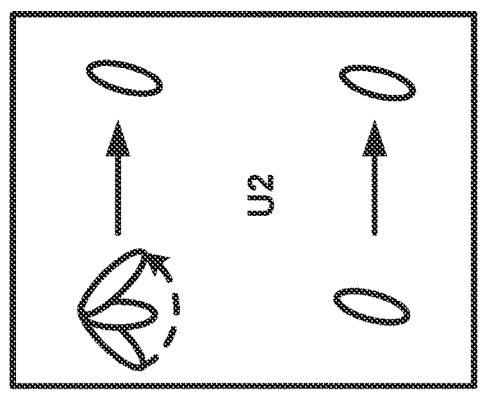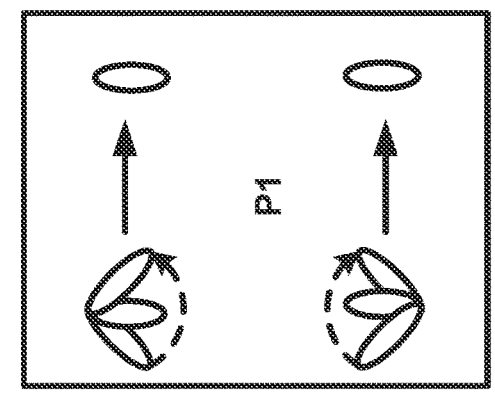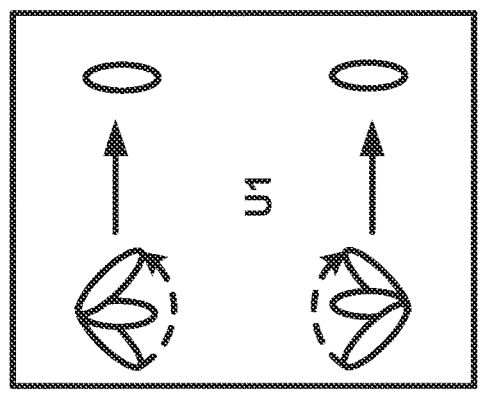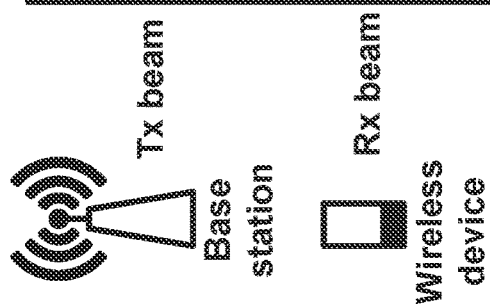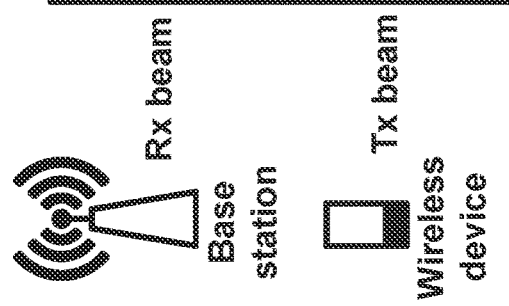
FIG. 12A
FIG. 12B

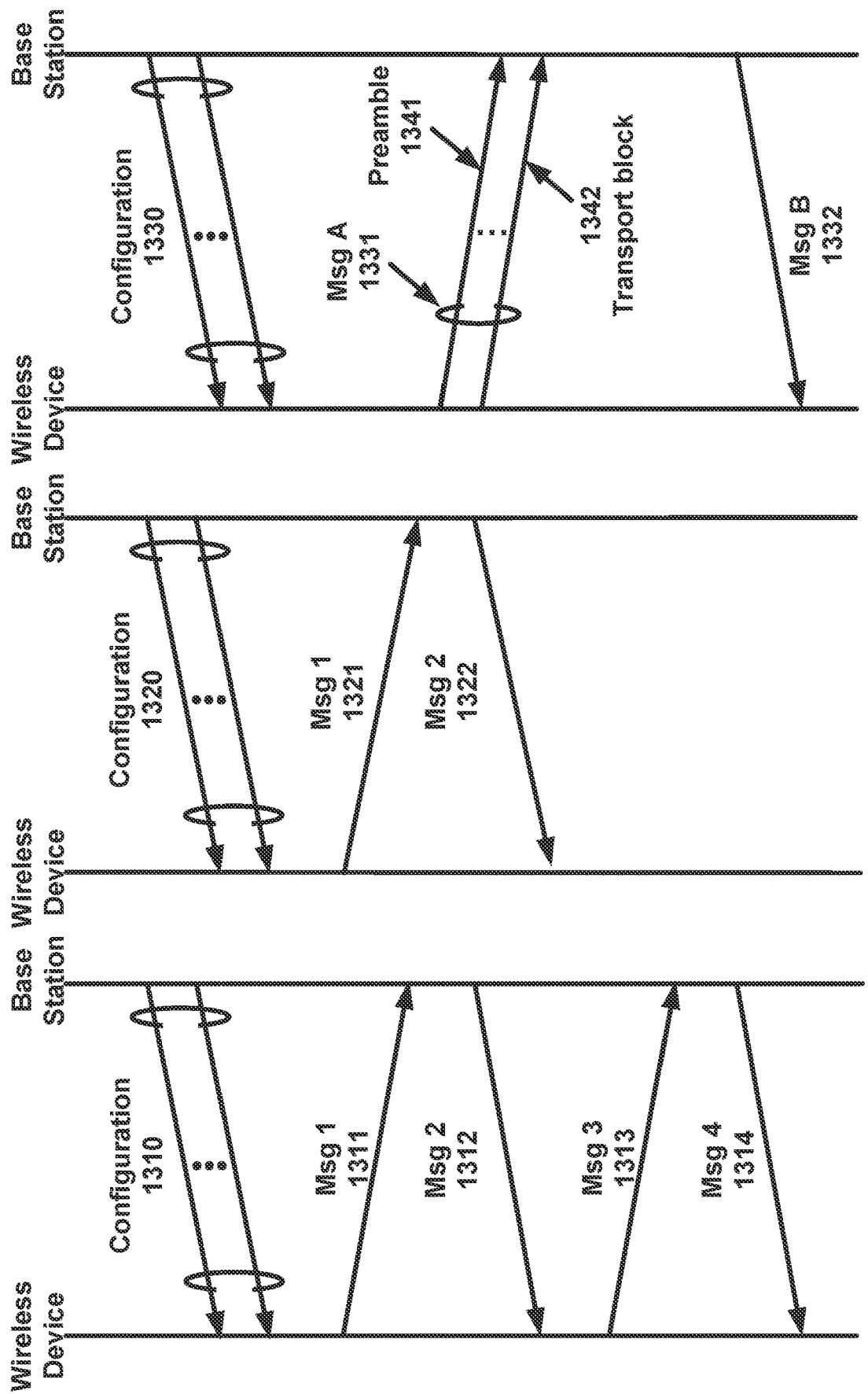

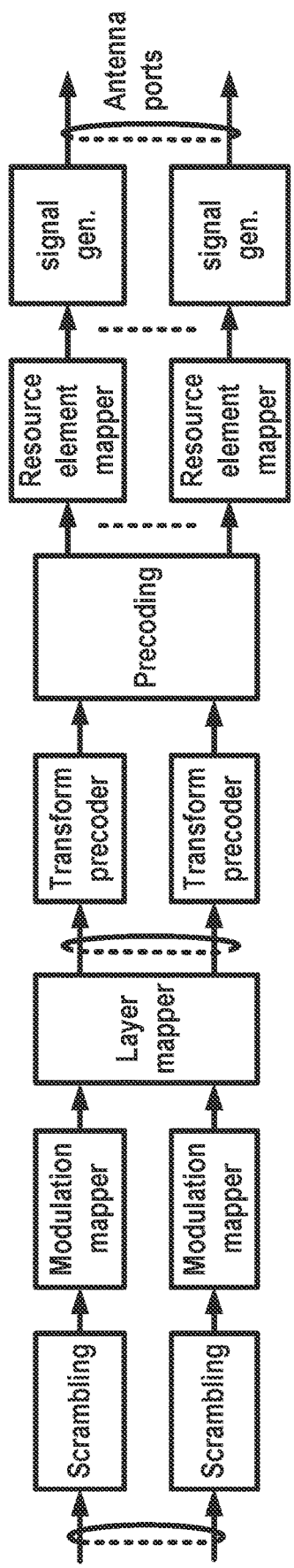
FIG. 16A
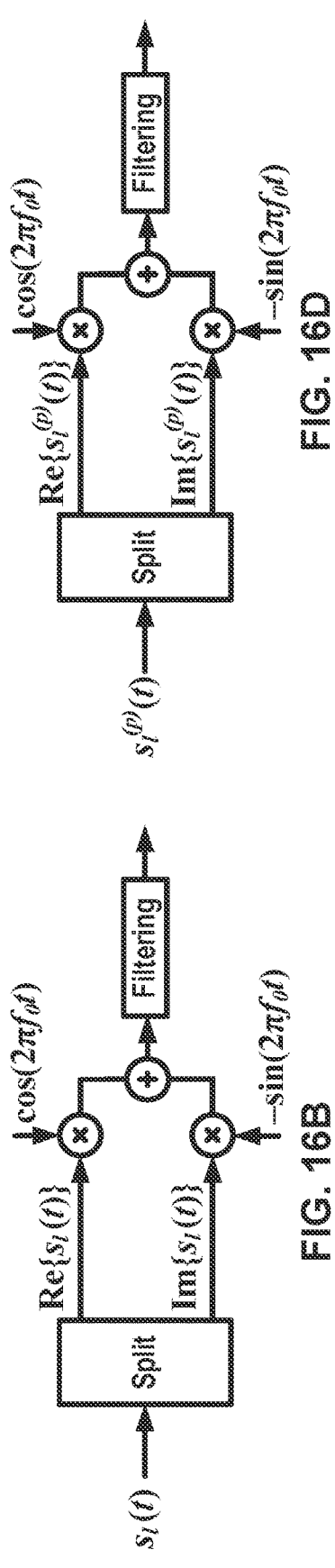
FIG. 16B
FIG. 16D
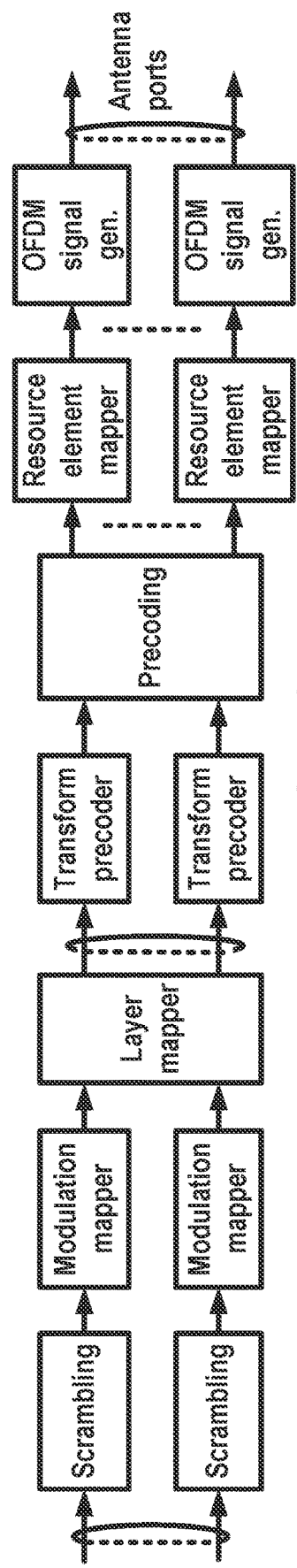
FIG. 16C

| R | F | LCID | Oct 1
| L | Oct 2

FIG. 17A

| R | F | LCID | Oct 1
| L | Oct 2
| L | Oct 3

FIG. 17B

| R | R | LCID | Oct 1

FIG. 17C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

CHANNEL ACCESS FOR WIRELESS COMMUNICATION

CROSS-REFERENCE TO RELATED APPLICATIONS

This application is a continuation of U.S. patent application Ser. No. 17/390,733, filed on Jul. 30, 2021, which claims the benefit of U.S. Provisional Application No. 63/059,598, filed on Jul. 31, 2020. Each of the above-referenced applications is hereby incorporated by reference in its entirety.

BACKGROUND

A base station sends a downlink message to a wireless device. The wireless device sends an uplink message based on receiving the downlink message and channel availability.

SUMMARY

The following summary presents a simplified summary of certain features. The summary is not an extensive overview and is not intended to identify key or critical elements.

Different types of channel access procedures (e.g., listen-before-transmit (LBT) procedures, with different channel sensing times) may be used to determine a channel availability for a transmission. A transmission (e.g., from a wireless device) may be directional and may use a transmission beam. A transmission beam group that is determined to be available (e.g., by a base station) may be indicated to the wireless device. A type of channel access procedure to be used for the transmission may be determined based on the available transmission beam group and the transmission beam. For example, a shorter channel access procedure may be used if the transmission beam group comprises the transmission beam. Determination of the channel access procedure based on the transmission beam and the transmission beam group may improve channel availability, latency, system capacity, and reuse of spatial resources among multiple communication devices.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 17A, FIG. 17B and FIG. 17C show example MAC subheaders.

FIG. 19 shows example logical channel identifier (LCID) values.

FIG. 20 shows example LCID values.

DETAILED DESCRIPTION

Figure 1A:
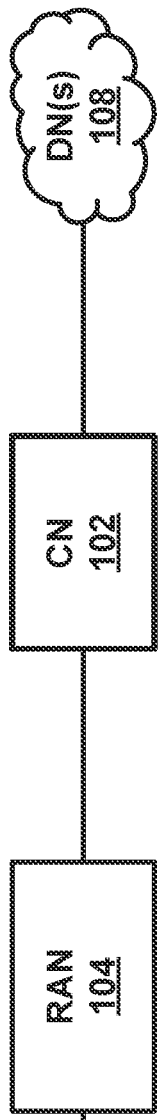
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to transmission and/or reception configuration and signaling for wireless communication.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/ configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
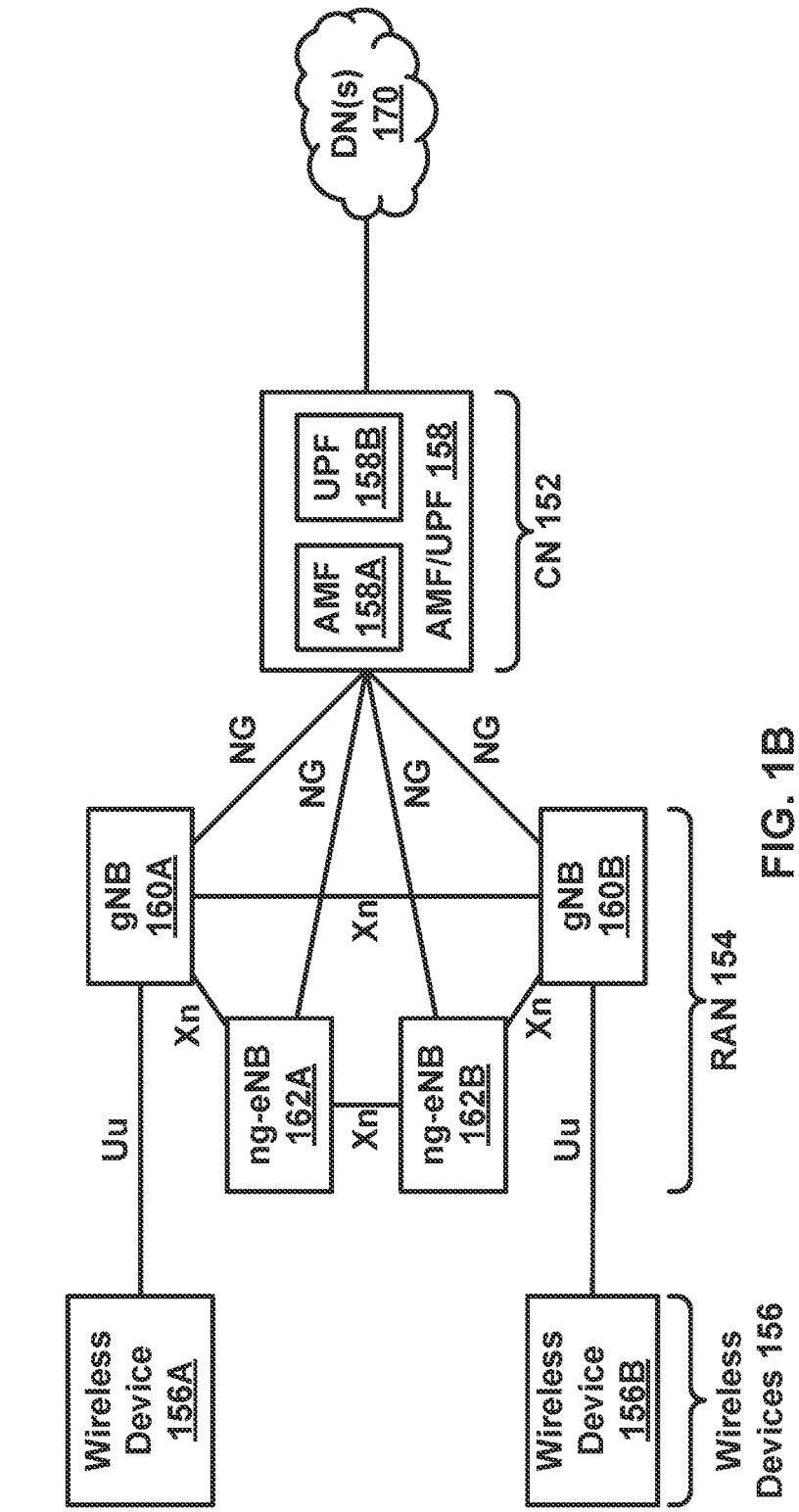

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s)

156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
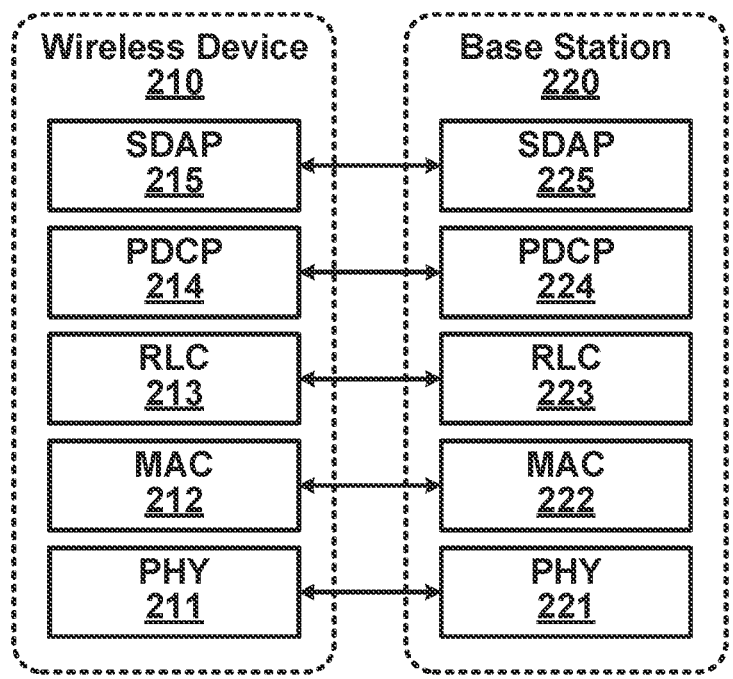
FIG. 2A shows an example user plane.
Figure 2B:
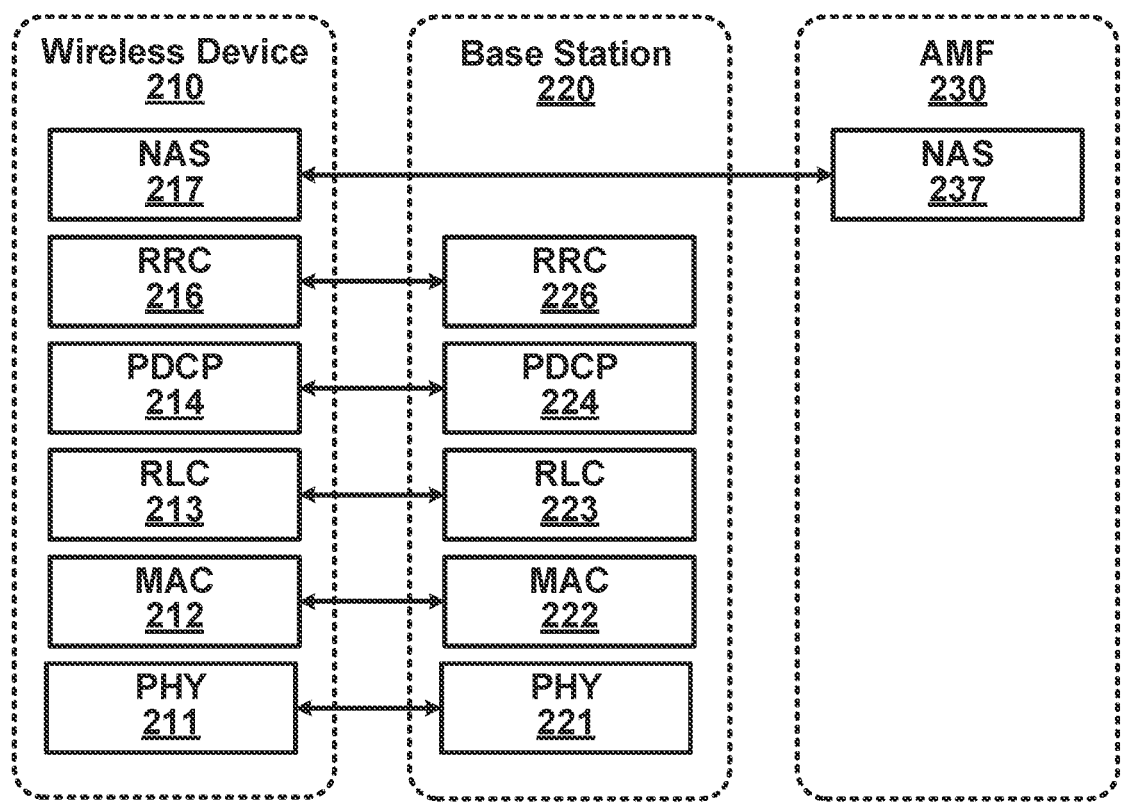
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
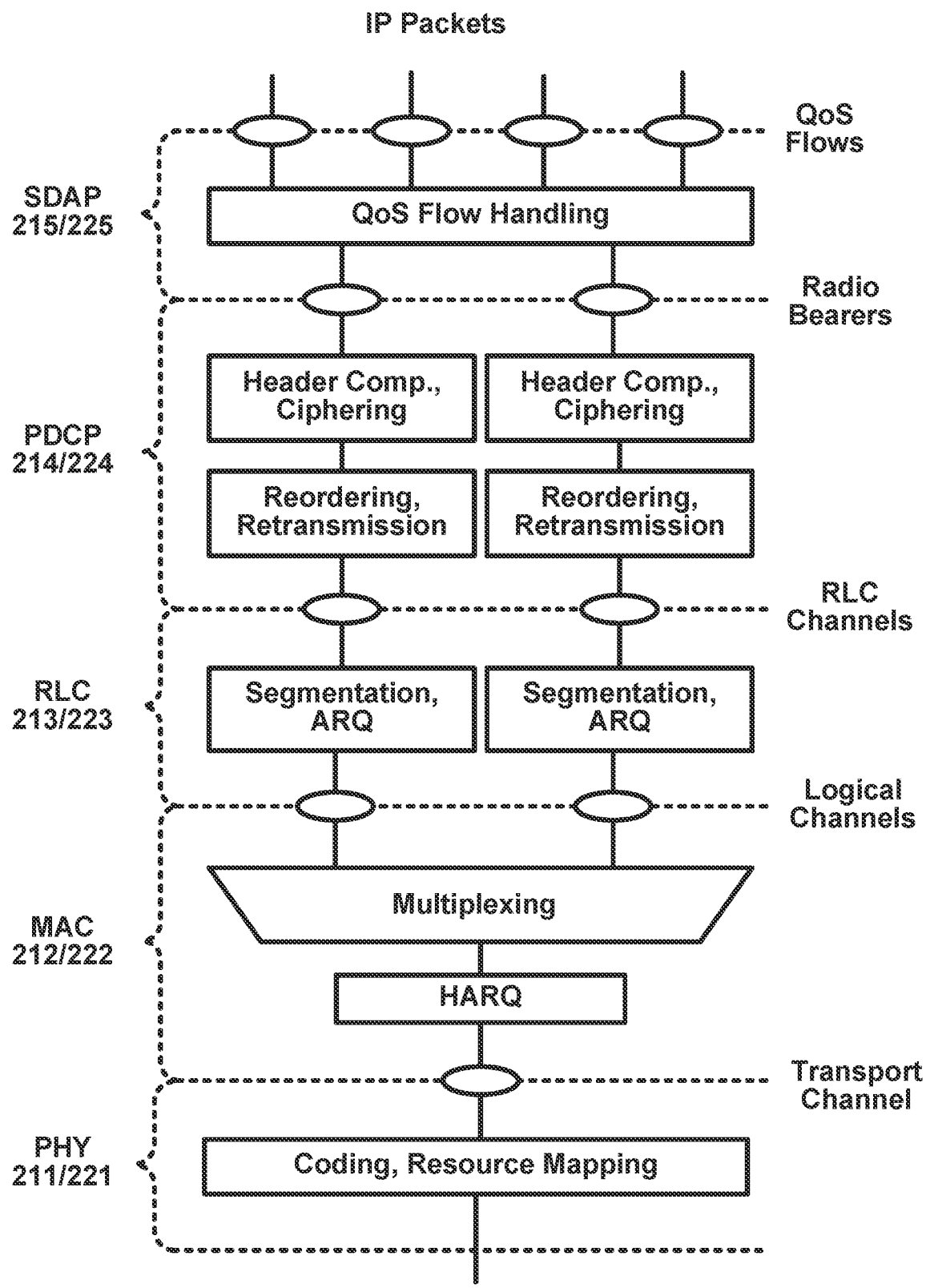
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TB s) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
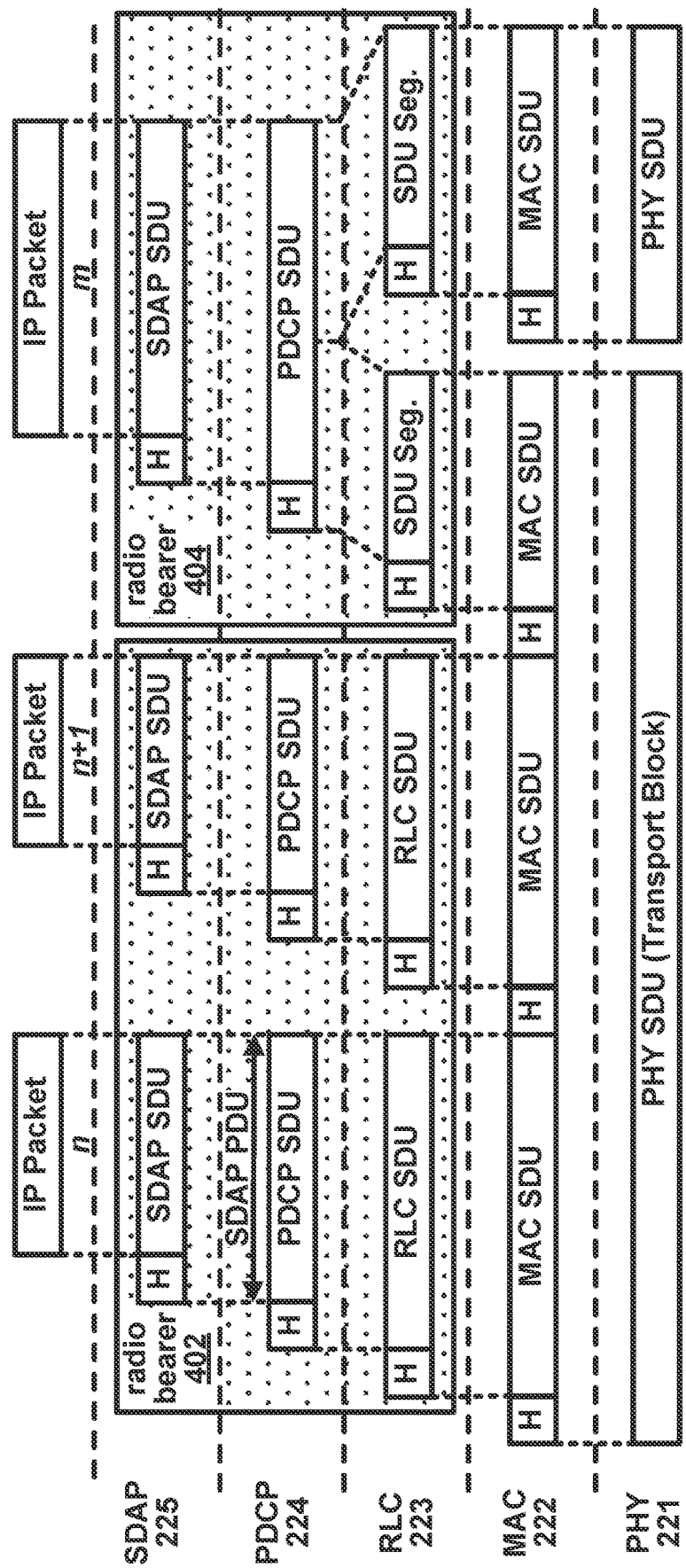
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration) . The NR MAC PDU structure may reduce a processing time and/or associated latency, for example, if the MAC PDU subheaders are computed before assembling the full MAC PDU.

Figure 4B:
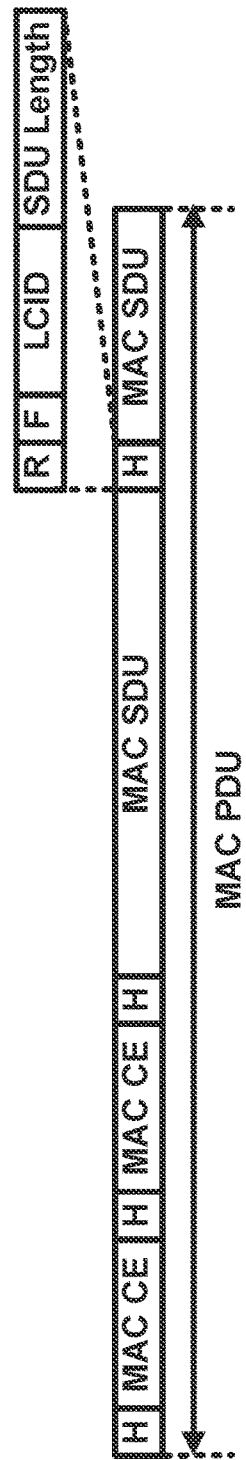
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
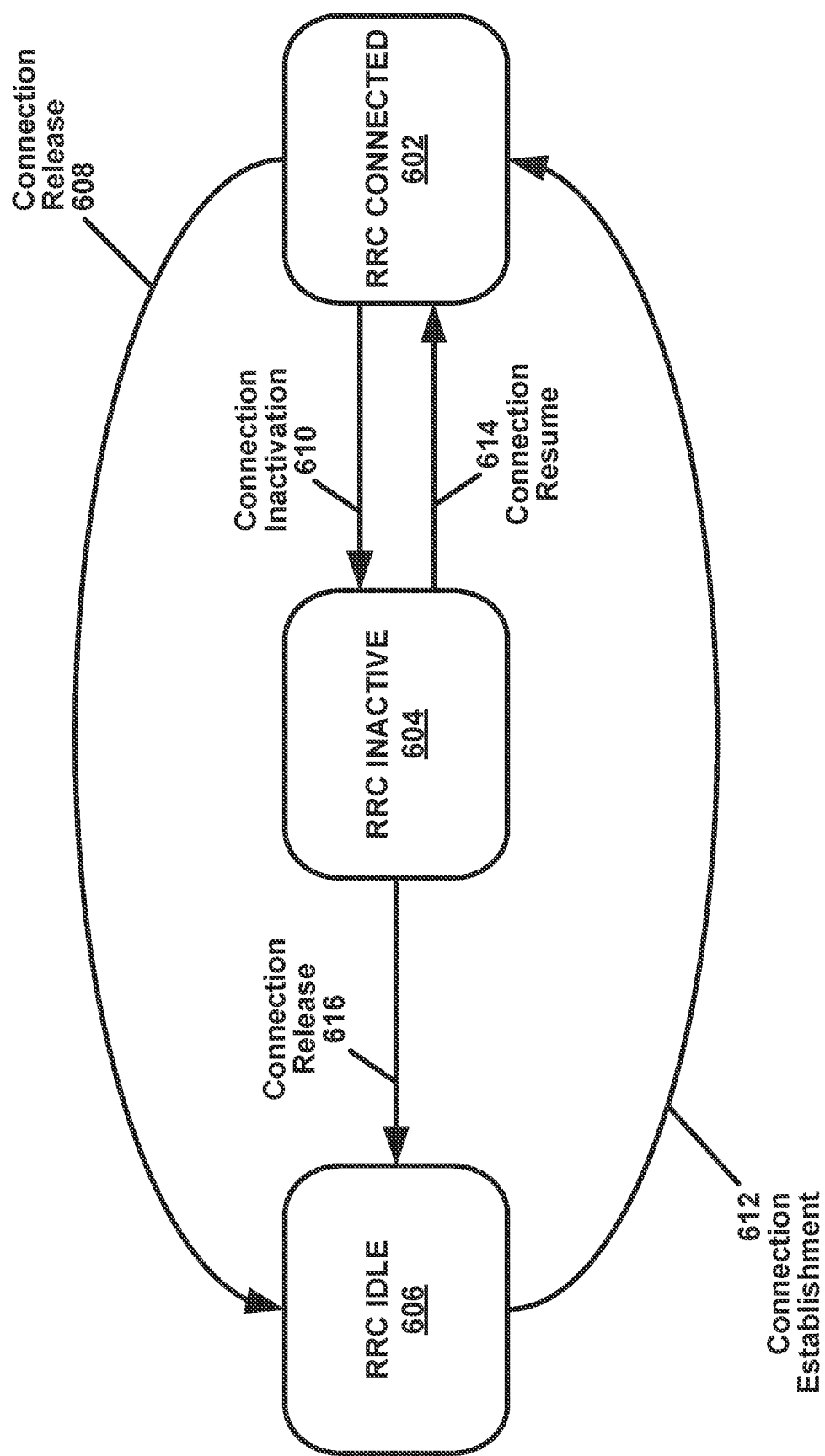
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
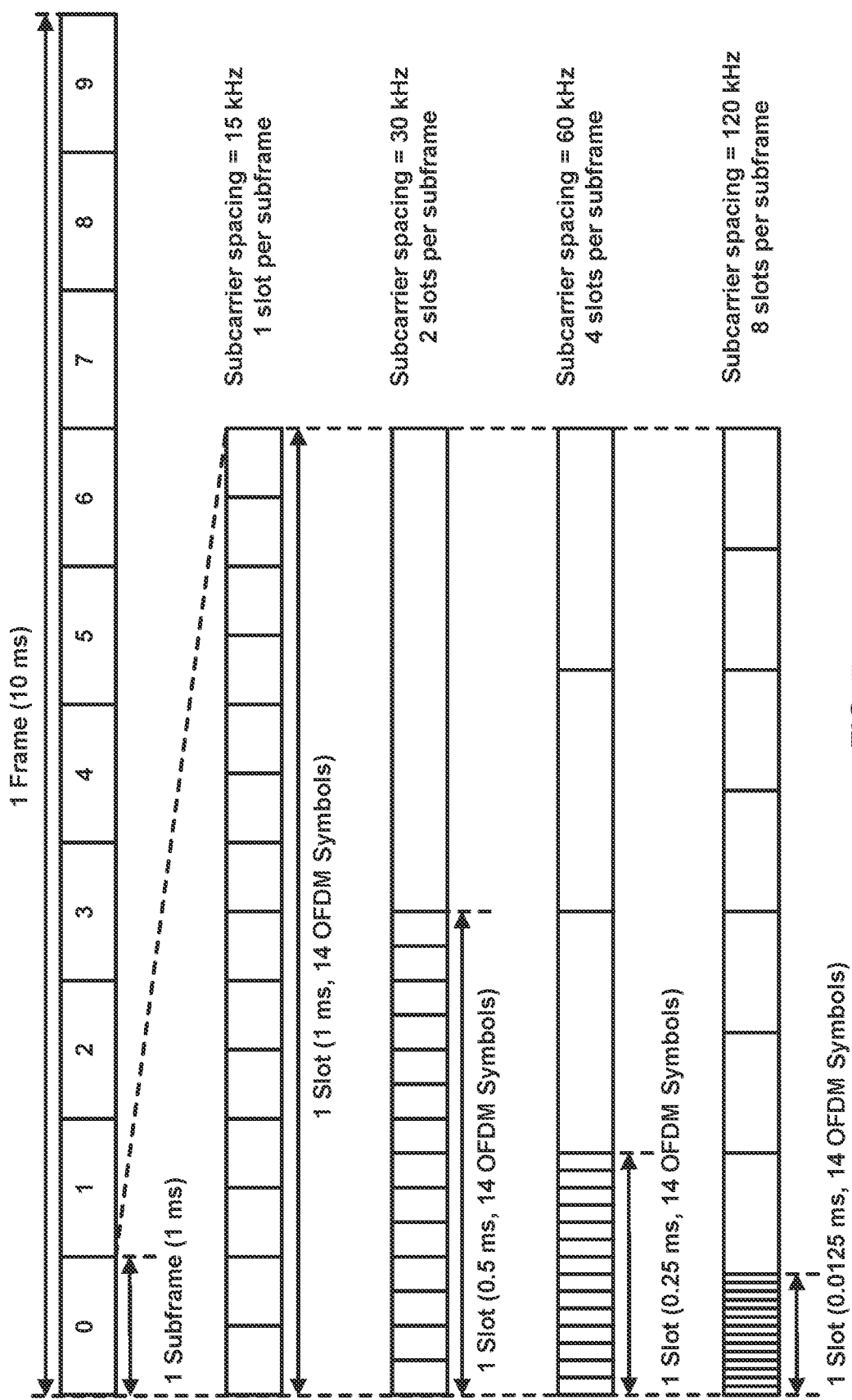
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
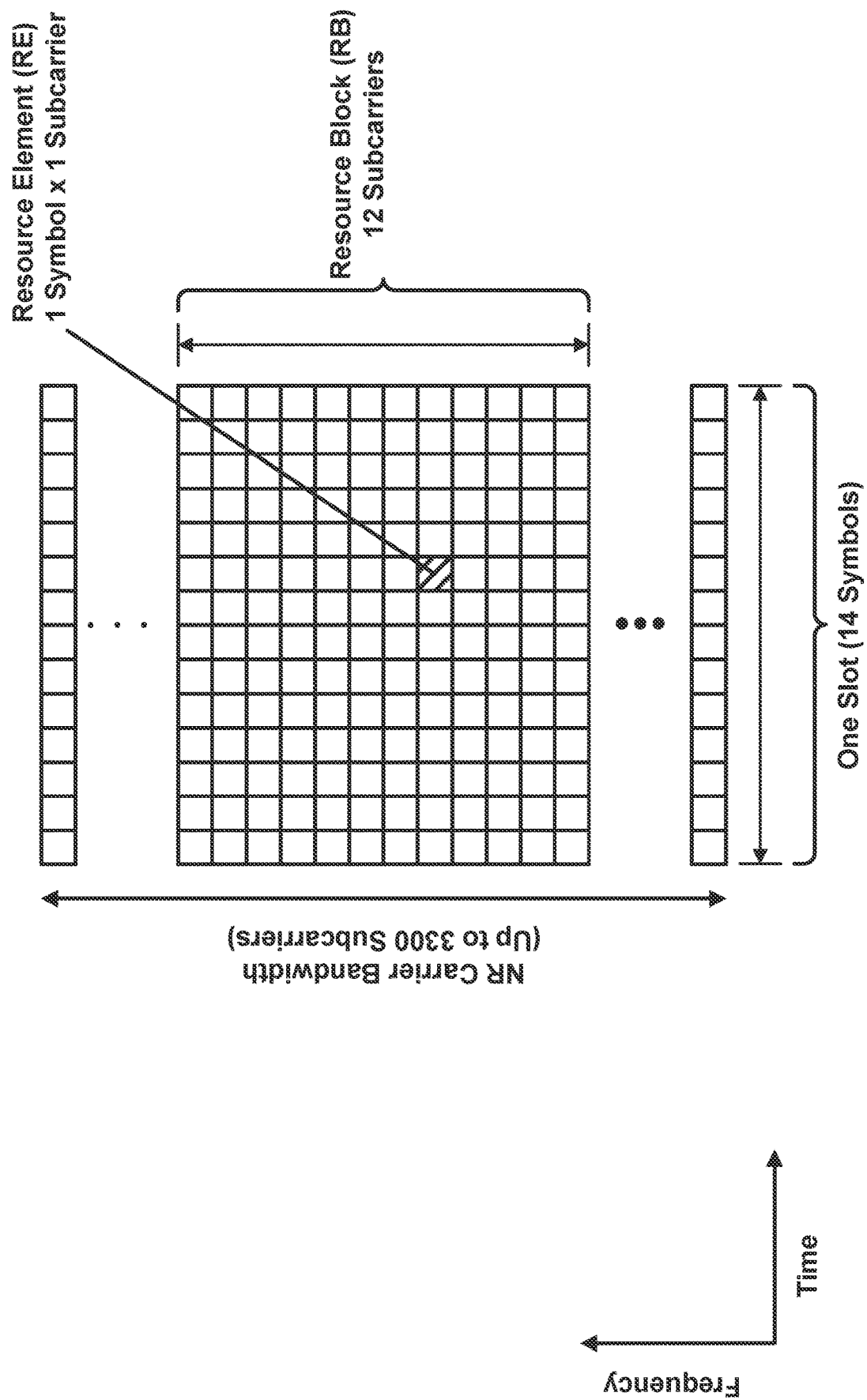
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
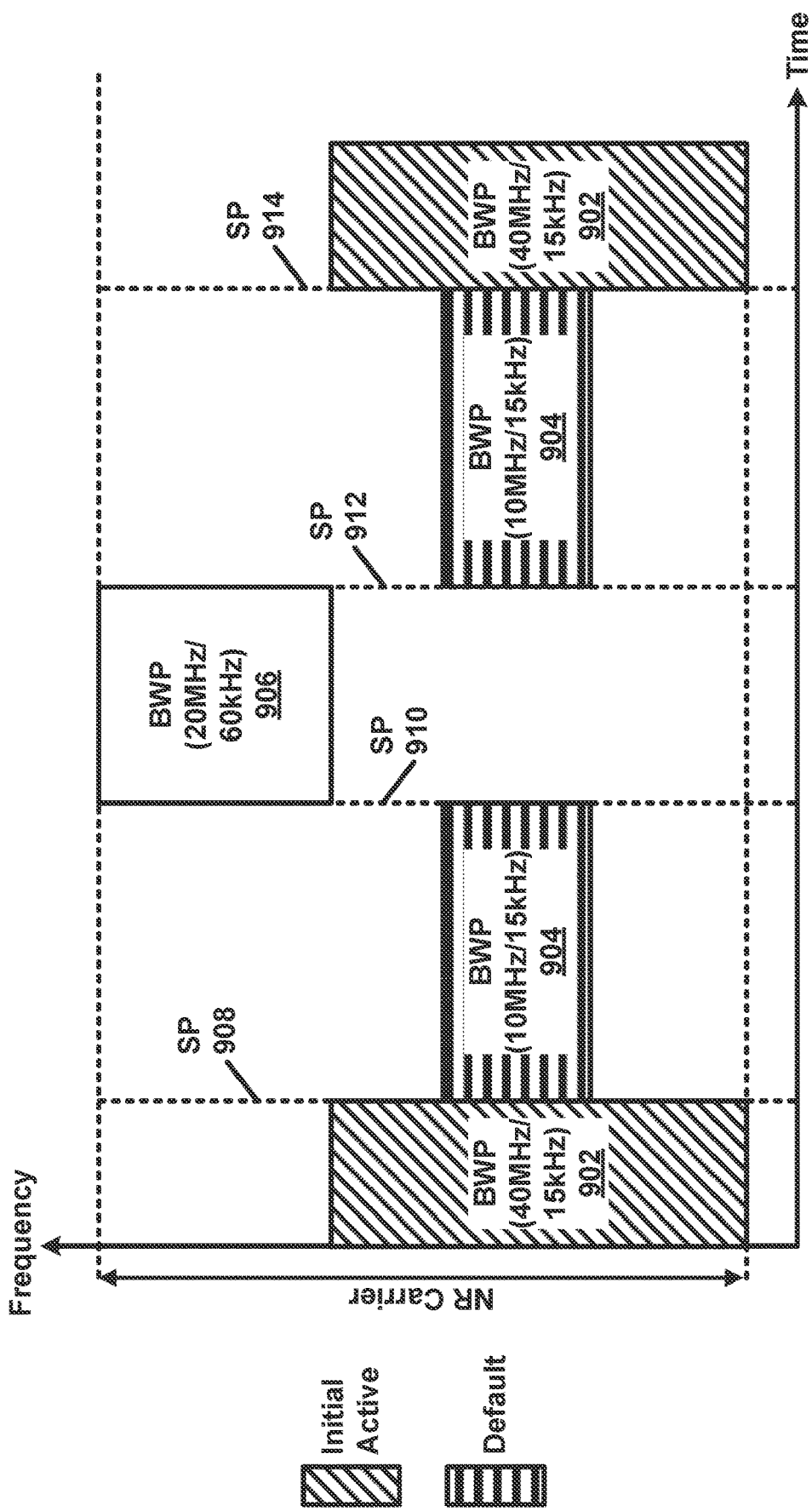
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
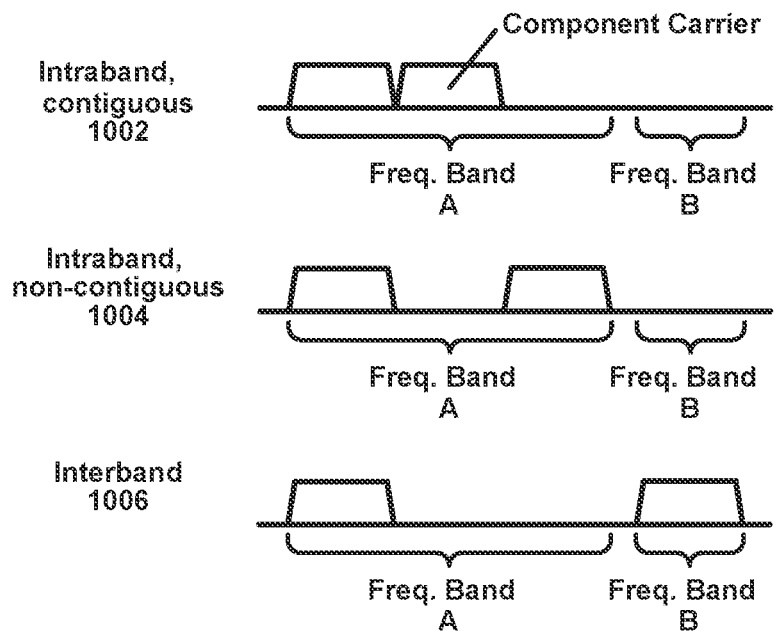
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
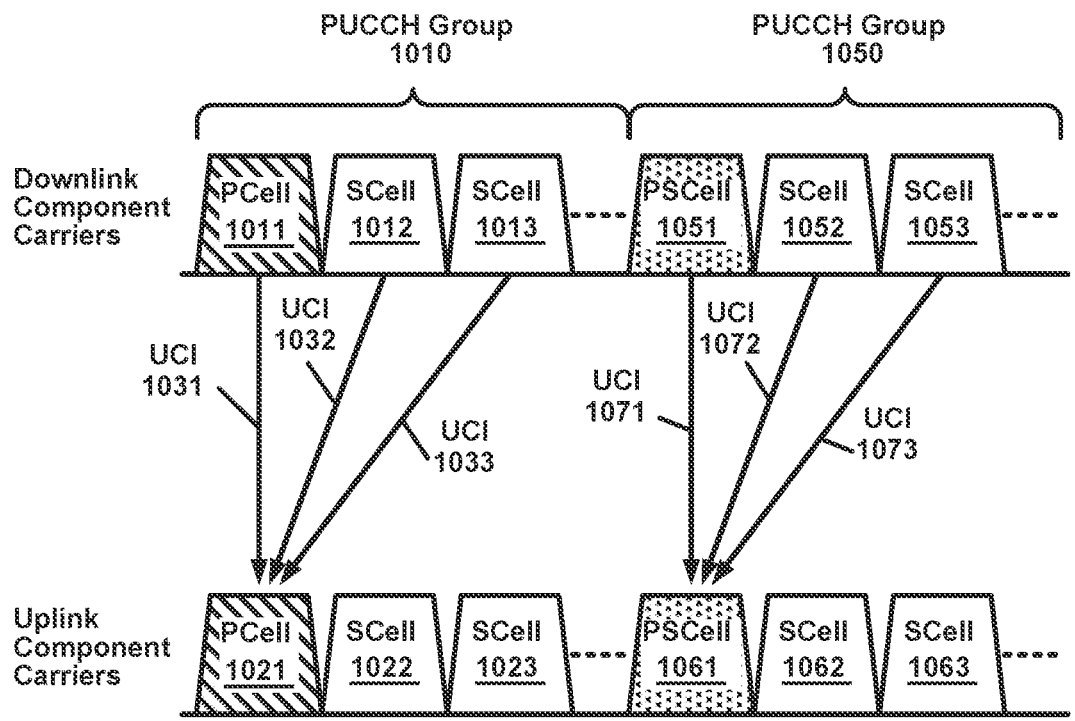
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
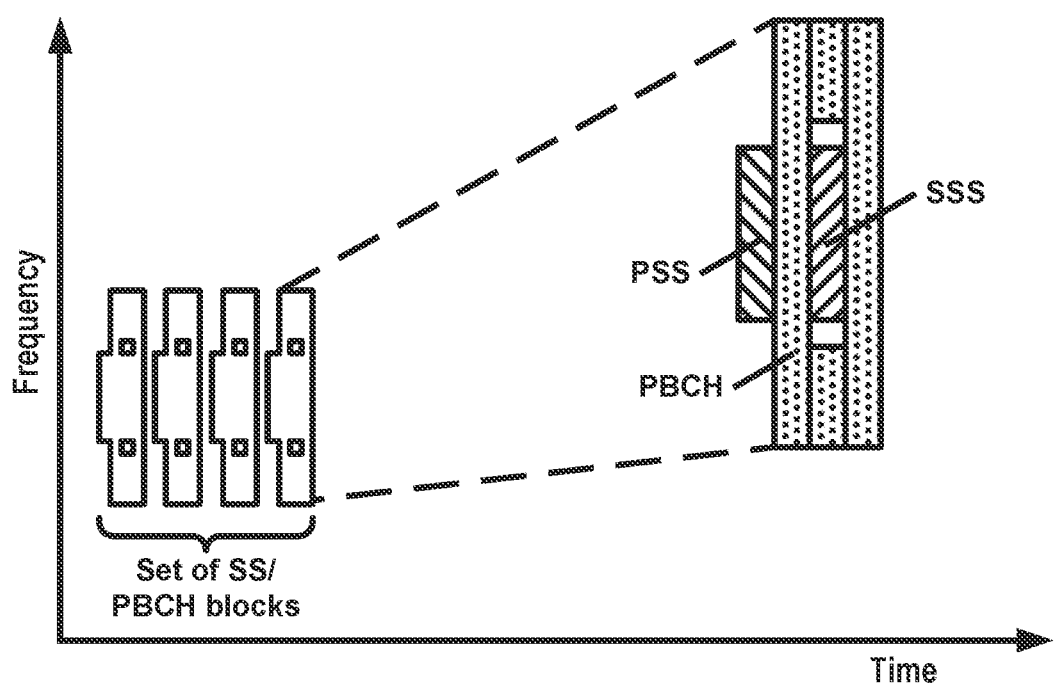
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RS s for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RS s for channel estimation or any other suitable purpose. The base station may configure a wireless device with one or more of the same/similar CSI-RSs. The wireless device may measure the one or more CSI-RS s. The wireless device may estimate a downlink channel state and/or generate a CSI report, for example, based on the measuring of the one or more downlink CSI-RS s. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RS s may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RS s for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RS s for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RS s may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RS s (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
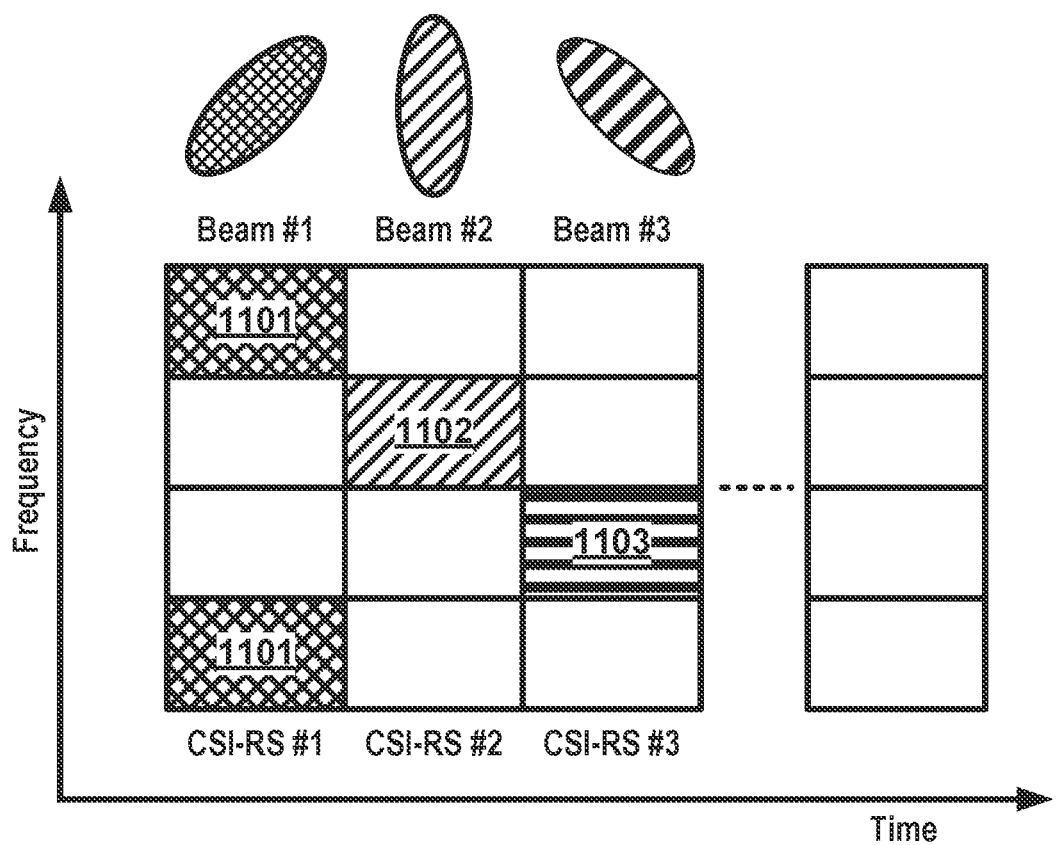
FIG. 11B shows an example mapping of one or more channel state information reference signals (CSI-RSs).

FIG. 11B shows an example mapping of one or more CSI-RSs. The CSI-RS s may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RS s. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RS s. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RS s) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RS s). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type 1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI=1+s\_id+14 \times t\_id+14 \times 80 \times f\_id+14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/ transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
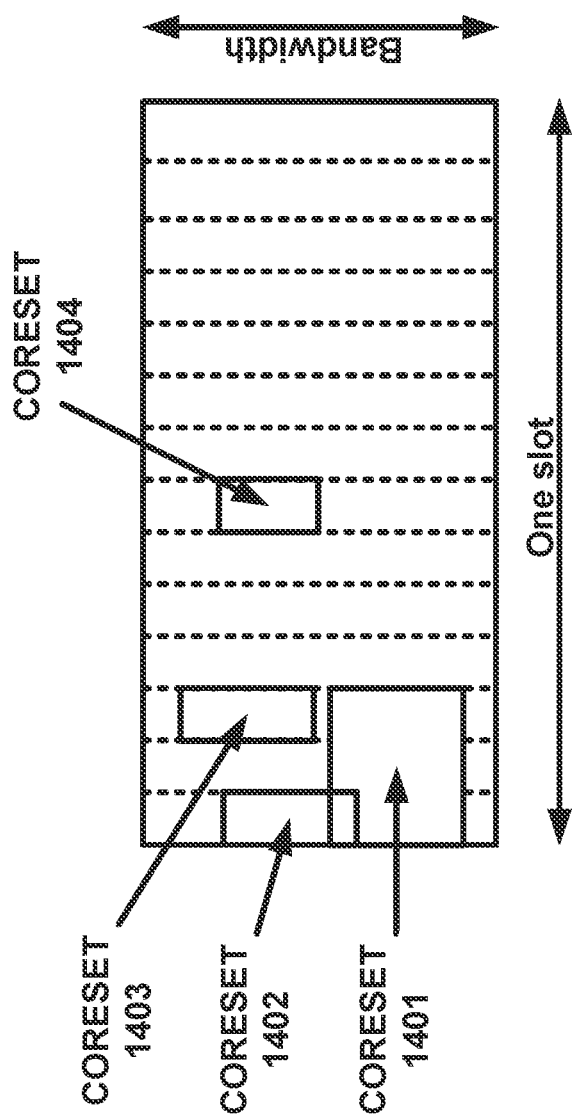
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
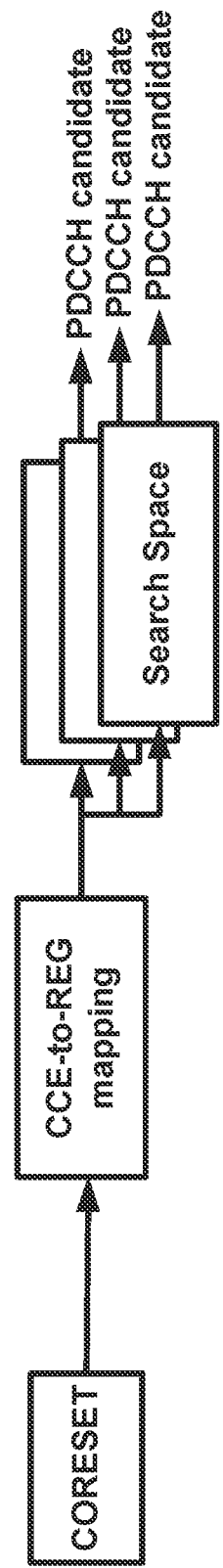
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
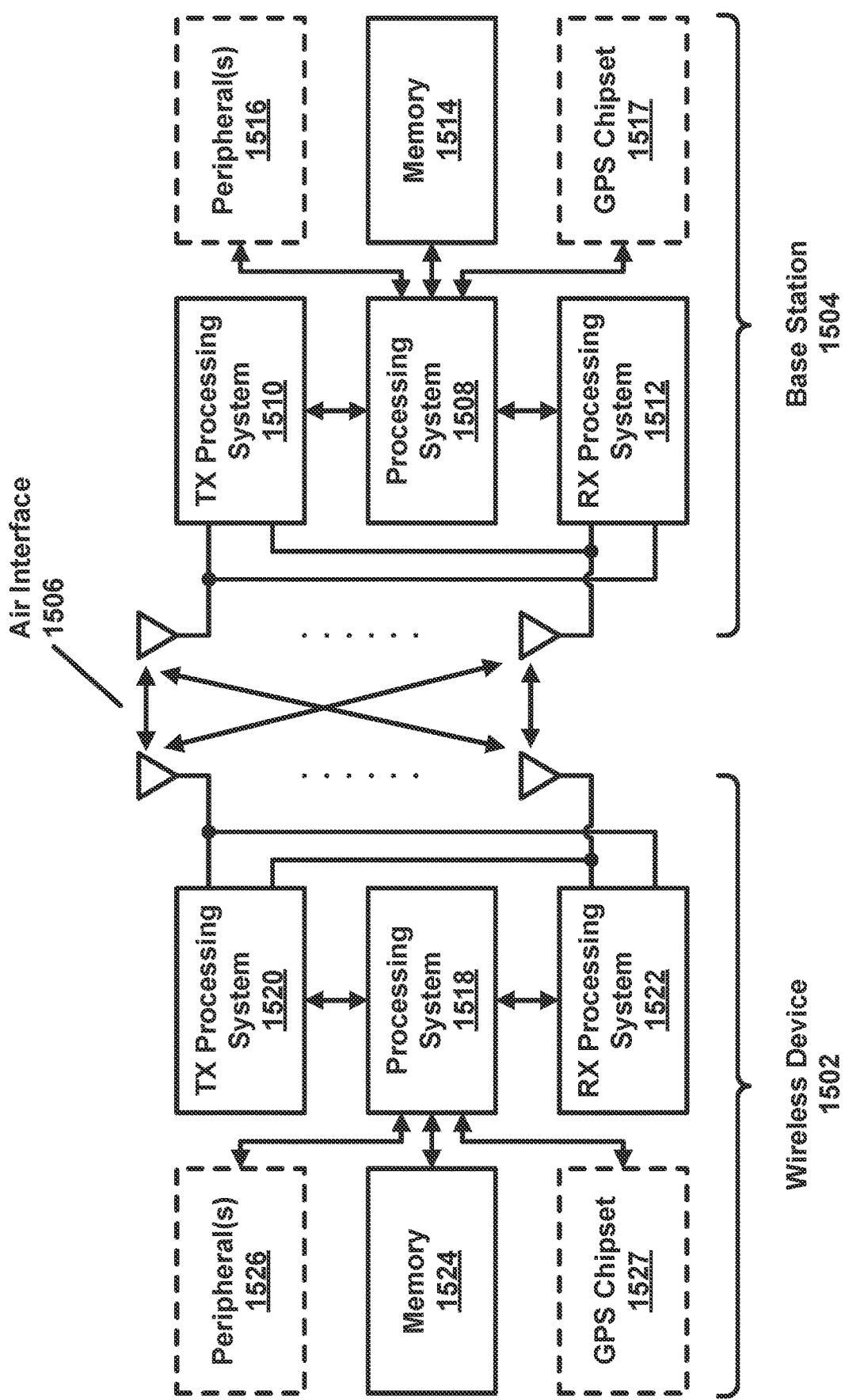
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
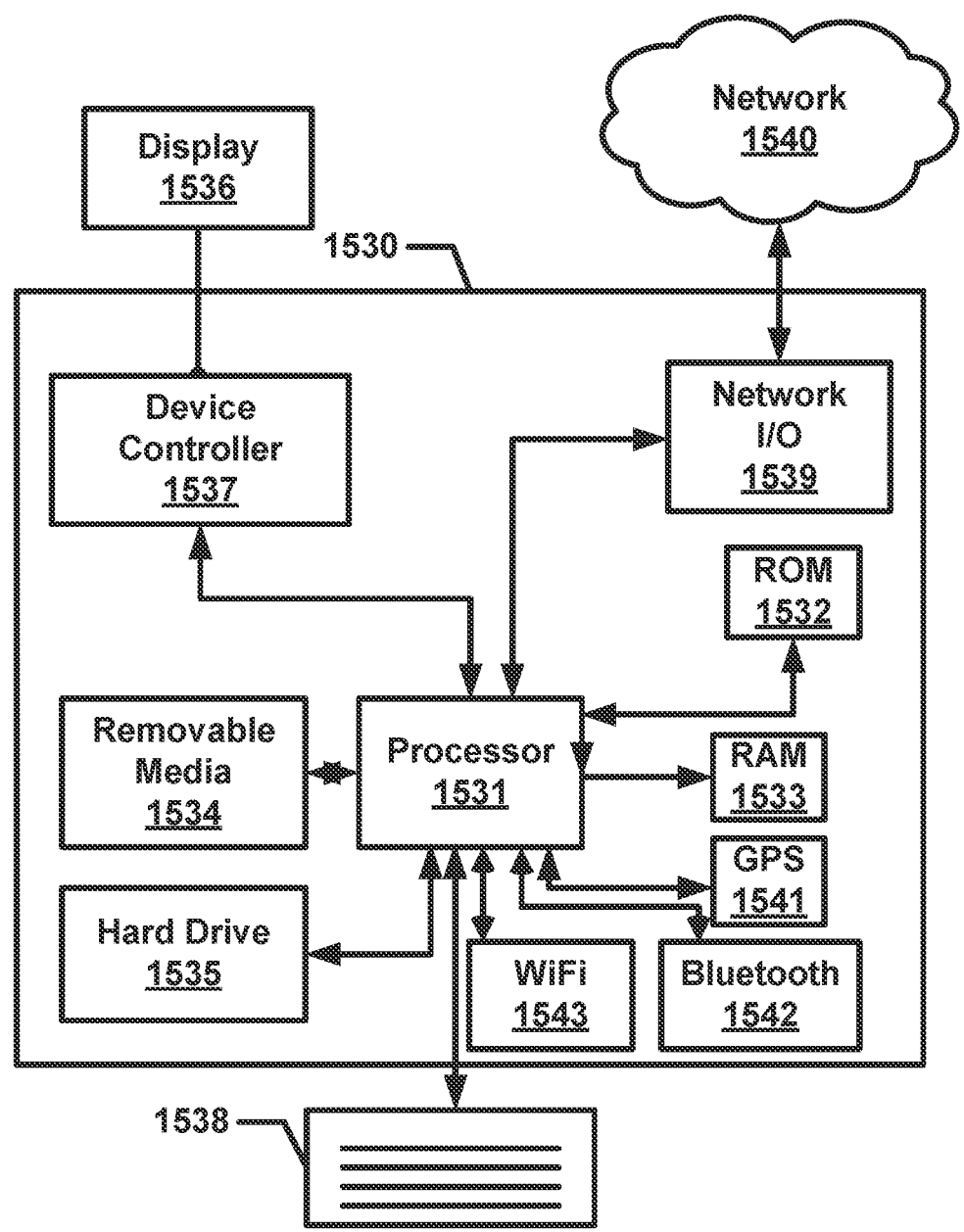
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; and/or an L field with multiple bits in length. The MAC subheader may correspond to a MAC SDU, a variable-sized MAC CE, and/or padding.

FIG. 17A shows an example of a MAC subheader comprising an eight-bit L field. The LCID field may have six bits in length (or any other quantity of bits). The L field may have eight bits in length (or any other quantity of bits).

FIG. 17B shows an example of a MAC subheader with a sixteen-bit L field. The LCID field may have six bits in length (or any other quantity of bits). The L field may have sixteen bits in length (or any other quantity of bits). A MAC subheader may comprise: a R field comprising two bits in length (or any other quantity of bits); and an LCID field comprising multiple bits in length (e.g., if the MAC subheader corresponds to a fixed sized MAC CE), and/or padding.

FIG. 17C shows an example of the MAC subheader. The LCID field may comprise six bits in length (or any other quantity of bits). The R field may comprise two bits in length (or any other quantity of bits).

Figure 18A:
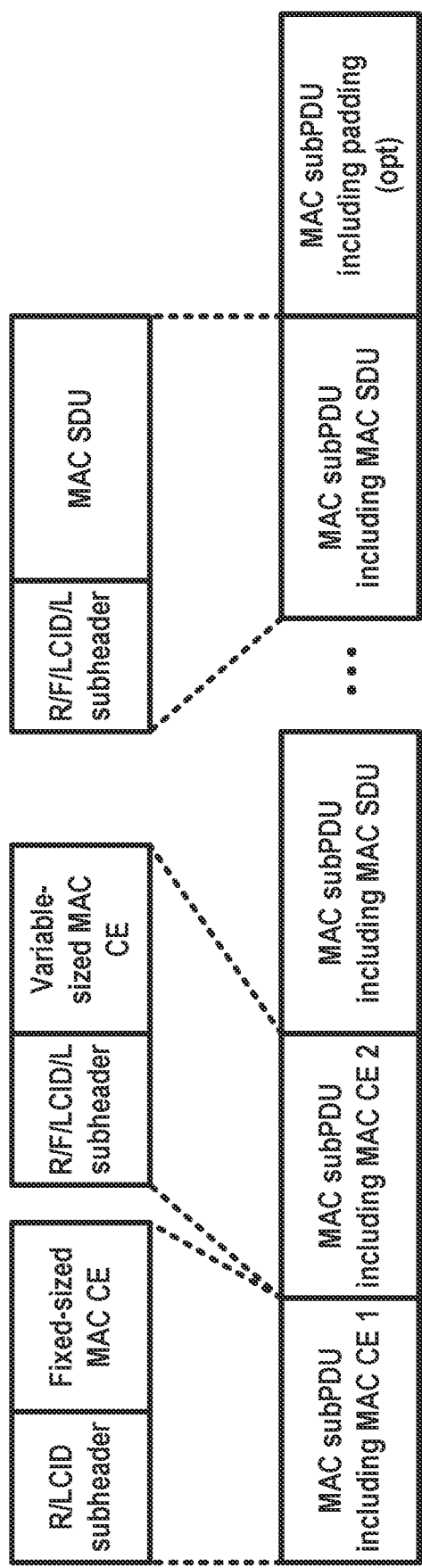
FIG. 18A and FIG. 18B show example MAC data unit formats.

FIG. 18A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

Figure 18B:
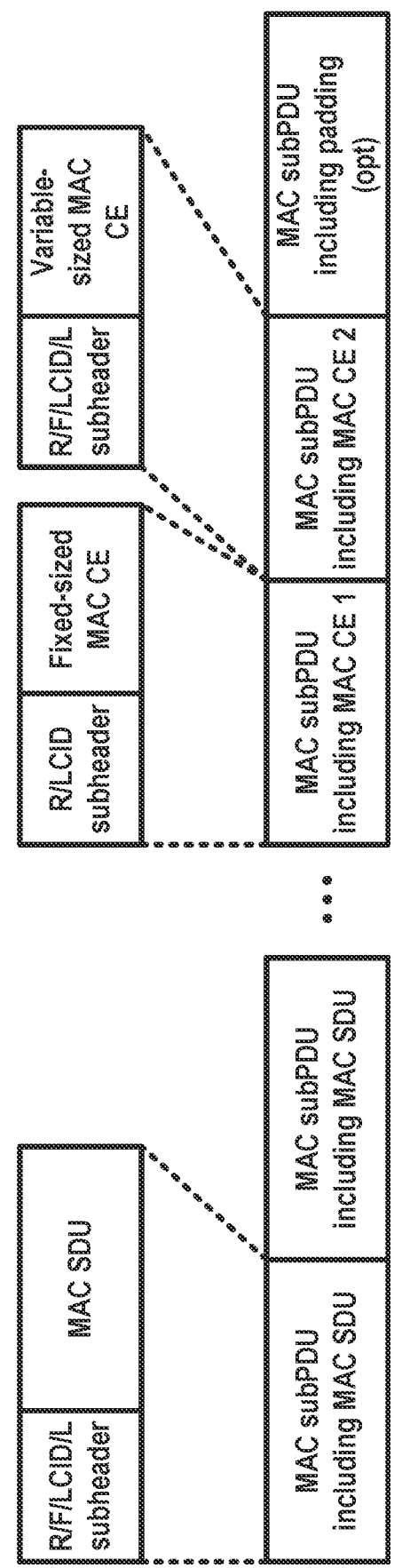

FIG. 18B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 19 shows first examples of LCIDs. FIG. 20 shows second examples of LCIDs. In each of FIG. 19 and FIG. 20, the left columns comprise indices, and the right columns comprises corresponding LCID values for each index.

FIG. 19 shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS resource set activation/deactivation MAC CE; a PUCCH spatial relation activation/deactivation MAC CE; a SP SRS activation/deactivation MAC CE; a SP CSI reporting on PUCCH activation/deactivation MAC CE; a TCI state indication for wireless device-specific PDCCH MAC CE; a TCI state indication for wireless device-specific PDSCH MAC CE; an aperiodic CSI trigger state subselection MAC CE; a SP CSI-RS/CSI-IM resource set activation/deactivation MAC CE; a wireless device contention resolution identity MAC CE; a timing advance command MAC CE; a DRX command MAC CE; a long DRX command MAC CE; an SCell activation and/or deactivation MAC CE (e.g., 1 octet); an SCell activation and/or deactivation MAC CE (e.g., 4 octets); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate that a MAC CE associated with the MAC subheader is a long DRX command MAC CE.

FIG. 20 shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate that a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising/indicating a timer (e.g., sCellDeactivationTimer). The wireless device may deactivate an SCell, for example, based on (e.g., after or in response) to an expiry of the timer (e.g., sCellDeactivationTimer).

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CSI-RS resource indicator (CRI) reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, and/or flush HARQ buffers associated with the activated SCell, for example, after or in response to deactivating the activated SCell.

A wireless device may refrain from performing certain operations, for example, if an SCell is deactivated. The wireless device may refrain from performing one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 21A:
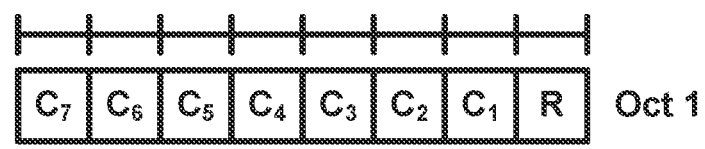
FIG. 21A and FIG. 21B show examples of SCell activation/deactivation MAC CE formats.

FIG. 21A shows an example of an SCell activation/deactivation MAC CE that may comprise one octet. A first MAC PDU subheader comprising a first LCID (e.g., LCID 111010) may indicate/identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 21B:
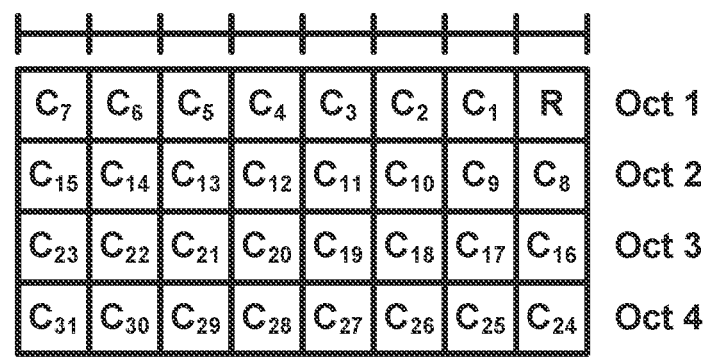

FIG. 21B shows an example of an SCell activation/deactivation MAC CE of four octets. A second MAC PDU subheader with a second LCID (e.g., LCID 111001) may indicate/identify the SCell activation/deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1).

A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station may configure a wireless device with uplink (UL) bandwidth parts (BWPs) and downlink (DL) BWPs. The base station may configure the wireless device with UL BWPs and DL BWPs to enable bandwidth adaptation (BA) on a cell (e.g., PCell). The base station may further configure the wireless device with at least DL BWP(s) (e.g., without configuring UL BWPs) to enable BA on a secondary cell (e.g., SCell). The base station may further configure the wireless device with the at least DL BWP(s), for example, if carrier aggregation is configured.

An initial active BWP, for the PCell, may be a first BWP used for initial access. A first active BWP, for the SCell, may be a second BWP configured for the wireless device to operate on the SCell, for example, based on the SCell being activated. A base station and/or a wireless device may independently switch/change a DL BWP and an UL BWP, for example, if operating in paired spectrum (e.g., FDD). A base station and/or a wireless device may simultaneously switch a DL BWP and an UL BWP, for example, if operating in unpaired spectrum (e.g., TDD).

A base station and/or a wireless device may switch between BWPs, among configured BWPs, based on DCI and/or a BWP inactivity timer. The base station and/or the wireless device may switch an active BWP to a default BWP, for example, if a BWP inactivity timer is configured for a serving cell and if the BWP inactivity timer expires. The default BWP may be configured by the network. One UL BWP for each uplink carrier and one DL BWP may be active at a time in an active serving cell configured with BA and operating using FDD. One DL/UL BWP pair may be active at a time in an active serving cell operating using TDD. Operating on the one UL BWP and the one DL BWP (or the one DL/UL pair) may improve wireless device battery consumption. BWPs other than the one active UL BWP and the one active DL BWP (and that the wireless device may be capable of using) may be deactivated. The wireless device may, on deactivated BWPs, refrain from monitoring PDCCH; and/or not transmit via PUCCH, PRACH, and UL-SCH.

A serving cell may be configured with at most a first quantity (e.g., four, or any other quantity) of BWPs. An activated serving cell may be limited to a maximum quantity of active BWPs at any point in time. The maximum may be one, or any other quantity. BWP switching for a serving cell may be used to activate an inactive BWP and deactivate an active BWP. The BWP switching may be controlled by a downlink transmission (e.g., a PDCCH transmission). The PDCCH transmission may indicate a downlink assignment and/or an uplink grant. The BWP switching may be controlled by a BWP inactivity timer (e.g., bwp-Inactivity-Timer). The BWP switching may be controlled by a MAC entity, for example, based on initiation of a random access procedure. One BWP may be initially active (e.g., without receiving a PDCCH transmission indicating a downlink assignment and/or an uplink grant), for example, based on addition of an SpCell or activation of an SCell. The active BWP for a serving cell may be indicated by RRC messaging and/or a PDCCH transmission. A DL BWP may be paired with a UL BWP, and BWP switching may be common (and/or simultaneous) for both UL and DL, for example, for unpaired spectrum.

A base station may use an information element (IE) (e.g., corresponding to a higher layer parameter CSI-Aperiodic-TriggerStateList) to configure a wireless device with one or more aperiodic trigger states (e.g., 1, 64, 128, or any other quantity of aperiodic trigger states). A codepoint of a CSI request field in DCI (e.g., a DCI message) may be associated with (or indicate) an aperiodic trigger state of the one or more aperiodic trigger states. The aperiodic trigger state may comprise one or more report configurations (e.g., 1, 8, 16, or any other quantity of report configurations, provided by a higher layer parameter associatedReportConfigInfoList). The wireless device may perform measurement(s) of CSI-RS and perform aperiodic reporting according to the one or more report configurations (e.g., in the associatedReportConfigInfoList) for the aperiodic trigger state, for example, based on receiving the DCI with the CSI request field indicating the aperiodic trigger state.

A report configuration (e.g., provided by a higher layer parameter CSI-AssociatedReportConfigInfo), of the one or more report configurations, may be identified/associated with a report configuration indicator/index (e.g., provided by a higher layer parameter CSI-ReportConfigId). The report configuration may comprise/indicate one or more CSI-RS resources (e.g., 1, 8, 16 CSI-RS resources). An aperiodic CSI-RS resource, of the one or more CSI-RS resources, may be associated with a TCI state (e.g., provided by a higher layer parameter qcl-info in IE CSI-AperiodicTriggerStateList) of one or more TCI state configurations. The TCI state may provide a QCL assumption (e.g., an RS, an RS source, SS/PBCH block, CSI-RS). The TCI state may provide a QCL type (e.g., QCL type A, QCL type D, etc.).

The wireless device may receive DCI from a base station. The DCI may comprise a CSI request field. The wireless device may receive the DCI via a PDCCH. The wireless device may receive the DCI, for example, based on monitoring the PDCCH. The DCI with the CSI request field may initiate (e.g., indicate, trigger) an aperiodic trigger state of the one or more aperiodic trigger states. A codepoint of the CSI request field in the DCI may indicate the aperiodic trigger state. The aperiodic trigger state may comprise one or more report configurations (e.g., a list of NZP-CSI-RS-ResourceSet). A report configuration (e.g., NZP-CSI-RS-ResourceSet), of the one or more report configurations, may comprise one or more CSI-RS resources (e.g., aperiodic CSI-RS resources, NZP-CSI-RS-Resources).

The base station may or may not configure the report configuration with a higher layer parameter (e.g., trs-Info). Configuring the report configuration without the higher layer parameter may comprise that a first antenna port for a first aperiodic CSI-RS resource, of the one or more CSI-RS resources, is different from a second antenna port for a second aperiodic CSI-RS resource of the one or more CSI resources. Configuring the report configuration without the higher layer parameter may result in an antenna port for each aperiodic CSI-RS resource of the one or more CSI-RS resources being different. The base station may or may not configure the report configuration with a higher layer parameter indicating repetition. A scheduling offset between a last symbol a the PDCCH transmission (e.g., comprising the DCI) and a first symbol of the one or more CSI-RS resources in the report configuration may be smaller than a second threshold (e.g., corresponding to a higher layer parameter beamSwitchTiming). The wireless device may report the second threshold. The second threshold may be a first value (e.g., 14, 28, 48, or any other quantity of symbols).

An aperiodic CSI-RS resource, of the one or more CSI-RS resources, may be associated with a first TCI state of the one or more TCI state configurations. The first TCI state may indicate at least one first RS. The first TCI state may indicate at least one first QCL type. The aperiodic CSI-RS resource being associated with the first TCI state may comprise that the wireless device receives an aperiodic CSI-RS, of the aperiodic CSI-RS resource, with the at least one first RS (indicated by the first TCI state) with respect to/based on the at least one first QCL type indicated by the first TCI state.

The base station may send/transmit a downlink signal, for example, based on a second TCI state. The second TCI state may indicate at least one second RS. The second TCI state may indicate at least one second QCL type. The wireless device may receive the downlink signal in one or more first symbols. The wireless device may receive an aperiodic CSI-RS, for the aperiodic CSI-RS resource, in one or more second symbols. The one or more first symbols and the one or more second symbols may overlap (e.g., fully or partially). The downlink signal and the aperiodic CSI-RS (or the aperiodic CSI-RS resource) may overlap, for example, based on the one or more first symbols and the one or more second symbols overlapping.

The downlink signal and the aperiodic CSI-RS (or the aperiodic CSI-RS resource) may overlap in a time duration (e.g., in a time period). The time duration may comprise at least one symbol. The time duration may comprise at least one slot. The time duration may comprise at least one subframe. The time duration may comprise at least one mini-slot. The time duration may comprise the one or more second symbols. The time duration may comprise the one or more first symbols.

The downlink signal may be a PDSCH transmission. The PDSCH transmission may be scheduled with an offset larger than or equal to a first threshold (e.g., provided by a higher layer parameter Threshold-Sched-Offset, and/or timeDurationForQCL). The downlink signal may be a second aperiodic CSI-RS. The CSI-RS may be scheduled with an offset larger than or equal a second threshold (e.g., e.g., indicated by a higher layer parameter beamSwitchTiming) The second threshold may be a first value (e.g., 14, 28, 48, or any other quantity of symbols). The downlink signal may be an RS (e.g., periodic CSI-RS, semi-persistent CSI-RS, SS/PBCH block, etc.).

The wireless device may apply a QCL assumption provided/indicated by the second TCI state for receiving the aperiodic CSI-RS. The wireless device may apply a QCL assumption provided/indicated by the second TCI state for receiving the aperiodic CSI-RS, for example, if the scheduling offset between the last symbol of the PDCCH transmission and the first symbol is smaller than the second threshold, and based on the downlink signal (e.g., based on the second TCI state) overlapping with the aperiodic CSI-RS (or the aperiodic CSI-RS resource). The applying the QCL assumption (e.g., provided/indicated by the second TCI state) for receiving the aperiodic CSI may comprise the wireless device receiving the aperiodic CSI-RS, based on the at least one second RS (indicated by the second TCI state), with respect to the at least one second QCL type indicated by the second TCI state.

A scheduling offset between a last symbol of the PDCCH transmission comprising the DCI and a first symbol of the one or more CSI-RS resources in the report configuration may be equal to or larger than a second threshold (e.g., beamSwitchTiming). The wireless device may report the second threshold. The second threshold may be a first value (e.g., 14, 28, 48) symbol. The wireless device may apply a QCL assumption (e.g., provided by the first TCI state) for the aperiodic CSI-RS resource of the one or more CSI-RS resources in the report configuration, for example, based on the scheduling offset being equal to or larger than the second threshold. The applying the QCL assumption (provided by the first TCI state) for the aperiodic CSI-RS resource may comprise that the wireless device receives the aperiodic CSI-RS of the aperiodic CSI-RS resource, based on the at least one first RS (indicated by the first TCI state), with respect to the at least one first QCL type indicated by the first TCI state.

Multiple (e.g., two, or any other quantity) transmission schemes for uplink may be supported for physical uplink shared channel (PUSCH). The multiple transmission schemes may comprise a codebook based transmission scheme and a non-codebook based transmission scheme. A wireless device may be configured with codebookbased transmission if a higher layer configuration parameter (e.g., txConfig in pusch-Config) indicates codebook based transmission (e.g., is set to codebook). The wireless device may be configured with non-codebook based transmission if the higher layer configuration parameter (e.g., txConfig) indicates non-codebook based transmission (e.g., is set to non-Codebook). The wireless device may not expect to be scheduled by one or more DCI formats (DCI format 0_1, or DCI format 0_2), for example, if the higher layer configuration parameter (e.g., txConfig) is not configured. A PUSCH transmission may be based on a single antenna port, for example, if the PUSCH transmission is scheduled by DCI corresponding to DCI format 0_0. The wireless device may not expect a PUSCH transmission to be scheduled by DCI corresponding to DCI format 0_0 in a BWP without configured PUCCH resource (e.g., with PUCCH-SpatialRelationInfo in frequency range 2 in RRC connected mode) except when a higher layer parameter (e.g., enableDefaultBeamPlForPUSCH0_0) is set as enabled.

A PUSCH may be scheduled by DCI format 0_0, DCI format 0_1, DCI format 0_2, or may be semi-statically configured, for example, for codebook based transmission. The wireless device may determine its PUSCH transmission precoder based on an SRS resource indicator (SRI), a transmit precoding matrix indicator (TPMI), and a transmission rank, for example, if the PUSCH is scheduled by DCI format 0_1, DCI format 0_2, or is semi-statically configured. The SRI, the TPMI, and the transmission rank may be indicated by DCI fields corresponding to SRS resource indicator and precoding information and number of layers for DCI format 0_1 and DCI format 0_2, or indicated by higher layer parameters (e.g., srs-ResourceIndicator and precodingAndNumberOfLayers). The SRS resource set(s) applicable for PUSCH scheduled by DCI format 0_1 or DCI format 0_2 may be defined by the entries of the higher layer parameters srs-ResourceSetToAddModList or srs-ResourceSetToAddModList-ForDCIFormat0_2 in SRS-Config, respectively. The TPMI may be used to indicate the precoder to be applied over the layers {0 . . . v−1} and that corresponds to an SRS resource selected by the SRI, for example, if multiple SRS resources are configured. The TPMI may be used to indicate the precoder to be applied over the layers {0 . . . v−1} and that corresponds to the SRS resource, for example, if a single SRS resource is configured. The transmission precoder may be selected from the uplink codebook that has a quantity of antenna ports equal to higher layer parameter nrofSRS-Ports in SRS-Config. The wireless device may be configured with at least one SRS resource, for example, if the wireless device is configured with the higher layer parameter txConfig set to codebook. The indicated SRI in slot n may be associated with the most recent transmission of an SRS resource identified by the SRI, where the SRS resource is prior to the PDCCH transmission carrying the SRI.

PUSCH may be scheduled by DCI format 0_0, DCI format 0_1, DCI format 0_2, or may be semi-statically configured, for example, for non-codebook based transmission. The wireless device may determine its PUSCH precoder and transmission rank based on an SRI, for example, if multiple SRS resources are configured and if the PUSCH is scheduled by DCI format 0_1, DCI format 0_2, or is semi-statically configured. The SRI may be indicated by a DCI field corresponding to SRS resource indicator in DCI corresponding to DCI format 0_1 and DCI format 0_2. The SRI may be indicated by a higher layer parameter (e.g., srs-ResourceIndicator). The SRS resource set(s) applicable for PUSCH scheduled by DCI corresponding to DCI format 0_1 or DCI format 0_2 may be defined by the entries of the higher layer parameter srs-ResourceSetToAddModList or srs-ResourceSetToAddModList-ForDCIFormat0_2 in SRS-Config, respectively. The wireless device may use one or multiple SRS resources for SRS transmission. The maximum quantity of SRS resources, in an SRS resource set, may be configured for the wireless device for simultaneous transmission via the same symbol. The maximum quantity of SRS resources may be based on the wireless device's capabilities. The SRS resources transmitted simultaneously may occupy the same RBs. At least one SRS port for an SRS resource may be configured. One SRS resource set may be configured with higher layer parameter (e.g., usage in SRS-ResourceSet) set to nonCodebook. The indicated SRI in slot n may be associated with the most recent transmission of SRS resource(s) identified by the SRI, where the SRS transmission is prior to the PDCCH comprising the SRI. The wireless device may perform one-to-one mapping from the indicated SRI(s) to the indicated demodulation RS (DMRS) ports(s) and their corresponding PUSCH layers $\{0 \ldots v-1\}$ given by DCI format 0_1 or by configuredGrantConfig in an increasing order.

Data traffic required to be serviced via cellular networks is expected to increase. More spectrum may be needed for cellular operators to meet an increasing demand for data associated with a variety of services (e.g., video delivery, large files, images, etc.). Wireless communications may use complimentary access technology to increase network capacity. Complementary access technology may comprise a combination of two or more access technologies. At least some types of wireless communications (e.g., compatible with 3GPP Release 16, earlier/later 3GPP releases or generations, and/or other access technology) may be enabled with interworking solutions that may allow usage of resources (e.g., an unlicensed spectrum) corresponding to other type(s) of wireless communications (e.g., WLAN, and/or other access technology). Complementary access technology that uses unlicensed spectrum may be deployed to meet wireless traffic usage and/or growth. Unlicensed spectrum, if available, may be an effective complement to licensed spectrum and/or may help in addressing high traffic in at least some scenarios (e.g., in areas that may be serviced by hotspots and/or other access points). Licensed assisted access (LAA) may enable the use of unlicensed spectrum for wireless communications (e.g., using 3GPP Release 16, earlier/later 3GPP releases or generations, LTE access technology, and/or other access technology). Usage of unlicensed spectrum may optimize network efficiency and improve network capacity, among other advantages.

A channel access procedure (e.g., a listen-before-talk (LBT) procedure) may be used for communication in an LAA cell. A communication device (e.g., a device, or a base station, etc.) may perform, in an LBT procedure, a clear channel assessment (CCA), for example, before using a channel. The CCA may utilize at least energy detection to determine presence or absence of other signals on a channel. The presence of other signals on the channel (e.g., an indication of a signal power level above a threshold) may indicate that the channel is occupied. The absence of other signals on the channel (e.g., an indication of a signal power level below a threshold) may indicate that the channel is clear. Usage of LBT may vary based on country-specific, regional-specific, and/or other area regulations and/or requirements. For example, European and Japanese regulations mandate the usage of LBT in the unlicensed bands (e.g., in the 5 GHz unlicensed band). Carrier sensing using LBT procedures may be used for fair sharing of an unlicensed spectrum.

Discontinuous transmission via an unlicensed carrier/spectrum may be enabled with a limited maximum transmission duration. Some functions may be supported by one or more signals sent (e.g., transmitted), for example, during (e.g., at the beginning of) a discontinuous LAA downlink transmission (e.g., via unlicensed spectrum). Channel reservation may be enabled by transmission of signals, by an LAA node, for example, based on (e.g., after) gaining channel access via a successful LBT procedure. Channel reservation may enable other nodes to determine that the channel is occupied based on receiving the transmitted signal with energy that is above a certain threshold. Procedures (e.g., functions) that may be supported by one or more signals for LAA operation with discontinuous downlink transmission may comprise one or more of the following: detection of the LAA downlink transmission (including cell identification) by wireless devices, time and frequency synchronization of wireless devices, etc.

Transmission (e.g., downlink and/or uplink transmission) based on LAA may use subframe boundary alignment. The subframe boundary alignment may be according to carrier aggregation (e.g., LTE-A carrier aggregation) timing relationships across serving cells aggregated by CA. A base station's transmission need not start only at a subframe boundary. LAA may support sending a transmission (e.g., a PDSCH transmission) even if not all OFDM symbols are available for transmission in a subframe according to LBT. Delivery of necessary control information for the transmission may also be supported.

An LBT procedure (e.g., a channel access procedure) may be performed for various wireless communications. An LBT procedure may be used, for example, for coexistence (e.g., fair and friendly coexistence) of LAA-based communications with other communications in an unlicensed spectrum (e.g., communications corresponding to other operators and/or other access technologies). LBT procedures on a node attempting to transmit via a carrier in the unlicensed spectrum may require the node to perform a CCA to determine whether the channel is free for use. An LBT procedure may comprise at least energy detection to determine if the channel is being used. Regulatory requirements in some regions (e.g., Europe) may specify an energy detection threshold. A node may assume that a channel is not free (e.g., the channel is being used by other node(s)), for example, if a node receives energy, via the channel, that is greater than this threshold. A node may optionally use a lower threshold for energy detection than that specified by regulatory requirements. Some communications (e.g., LAA communications) may adaptively change the energy detection threshold. For example, communications (e.g., LAA communications) may adaptively lower the energy detection threshold from an upper bound. Adaptation of a threshold may comprise static and/or semi-static determination of the threshold. Category 4 LBT procedures and/or other type of LBT procedures may be used.

Various example LBT procedures (e.g., different types/categories of LBT procedures) may be used. Category 1 LBT procedure (e.g., no LBT procedure) may be used. An LBT procedure might not be used by a transmitting entity, for example, if a category 1 LBT procedure is selected/determined by the transmitting entity. An LBT procedure might not be used by a transmitting entity, for example, for transmission of some signals, in at least some implementation scenarios, in at least some situations, and/or for transmission in at least some frequencies. Category 2 LBT procedure (e.g., LBT procedure without random back-off, or short LBT procedure) may be used. A duration of time for which a channel is to be sensed to be idle (e.g., by a wireless device, by a base station) before a transmitting entity may send/transmit data may be deterministic. Category 3 LBT procedure (e.g., an LBT procedure with random back-off with a contention window of fixed size) may be used. The LBT procedure may have the following procedure as at least one of its components. A transmitting entity (e.g., a wireless device, a base station) may select a random number N within a contention window. A size of the contention window may be specified by minimum and maximum possible values of N. A size of the contention window may be fixed. The random number N may be used in the LBT procedure to determine the duration of time that the channel is to be sensed to be idle before the transmitting entity may send/transmit data in the channel. Category 4 LBT procedure (e.g., an LBT procedure with random back-off with a contention window of variable size) may be used. A transmitting entity (e.g., a wireless device, a base station) may select a random number N within a contention window. The size of contention window may be specified by minimum and maximum possible values of N. The transmitting entity may vary the size of the contention window and select the random number N within the contention window. The random number N may be used in the LBT procedure to determine a duration of time that the channel is to be sensed to be idle before the transmitting entity may send/transmit data in the channel.

LAA may use a UL LBT procedure at a wireless device. The UL LBT procedure may be different from a DL LBT procedure. The uplink LBT procedure and the downlink LBT procedure may use different LBT protocols and/or parameters, for example, because the LAA for UL transmission may be based on scheduled access (e.g., which may affect a wireless device's channel contention opportunities). Other considerations motivating a different UL LBT procedure include, but are not limited to, multiplexing of multiple wireless devices in a single subframe.

A DL transmission burst may be a continuous transmission from a DL transmitting node with no transmission immediately before and/or after from the node on the same CC. An UL transmission burst from a wireless device perspective may be a continuous transmission from a wireless device with no transmission immediately before and/or after from the same wireless device on the same CC. An UL transmission burst may be defined from a wireless device's perspective. An UL transmission burst may be defined from a base station's perspective. DL transmission burst(s) and UL transmission burst(s) based on LAA may be scheduled using TDM over a same unlicensed carrier, for example, if a base station operates DL and UL LAA over the same unlicensed carrier. An instant of time may comprise a DL transmission burst and/or an UL transmission burst.

Single and multiple DL to UL switching and UL to DL switching within a shared base station channel occupancy time (COT) may be supported. Gap length and/or single or multiple switching points may have different LBT requirements. LBT may not be used for a gap less than a first time duration (e.g., 16 µs, or any other first time duration). One-shot LBT may be used for a gap that is greater than the first time duration and less than a second time duration (e.g., 25 µs, or any other second time duration). One-shot LBT may be used, for example, for single switching point and if the gap from DL transmission to UL transmission exceeds the second time duration. One-shot LBT may be used, for example, for multiple switching points and if the gap from DL transmission to UL transmission exceeds the second time duration.

A signal may be detected by a wireless device with low complexity (e.g., reduced processing requirements). Detection with low complexity may be useful for at least one of: power saving at the wireless device, improved coexistence with other systems, achieving spatial reuse at least within the same operator network, performing serving cell transmission burst acquisition, etc.

Operation on unlicensed bands (e.g., new radio-unlicensed (NR-U) bands) may use a signal that may contain at least SS/PBCH block burst set transmission. Other channels and/or signals may be transmitted together as part of the signal. There may or may not be a gap within a time span in which the signal is transmitted at least within a beam. Gaps may be needed for beam switching.

A block-interlaced based PUSCH may be used. A same interlace structure may be used for PUCCH and PUSCH. Interlaced based PRACH may be used.

An initial active DL/UL BWP may be approximately 20 MHz (or any other bandwidth) for the 5 GHz band (or any other band). An initial active DL/UL BWP may be approximately 20 MHz (or any other bandwidth) for the 6 GHz band (or any other band). An initial active DL/UL bandwidth for the 5 GHz band and the 6 GHz band may be same (e.g., 20 MHz), for example, if similar channelization is used for both the 5 GHz band and the GHz band.

A wireless device may send/transmit one or more HARQ ACK/NACK bits corresponding to a data packet. The wireless device may send the HARQ ACK/NACK bits in the same COT in which the wireless receives the data packet. A wireless device may transmit one or more HARQ ACK/NACK bits corresponding to a data packet in a first COT different from a second COT in which the wireless device receives the data packet.

Dependencies of HARQ process information on a configured/predefined timing, relative to a received data packet, may be removed. UCI via PUSCH may comprise HARQ process indicator/identification (ID), new data indication (NDI), redundancy version indicator/identification (RVID). Downlink feedback information (DFI) may be used for transmission of HARQ feedback for configured grant.

A base station and/or a wireless device may support both contention-based random access (CBRA) and contention-free random access (CFRA) on a cell (e.g., NR-U cell, NR-U SpCell). CFRA may be supported on a cell (e.g., NR-U SCells). RAR may be sent/transmitted via a cell (e.g., SpCell).

Carrier aggregation between a primary cell (e.g., NR cell) in licensed band (e.g., NR PCell) and a secondary cell (e.g., NR cell) in unlicensed band (e.g., NR-U SCell) may be supported. For example, an NR-U SCell may correspond to both DL and UL, or may correspond to DL-only. Dual connectivity between a primary cell (e.g., LTE cell) in licensed band (e.g., LTE PCell) and a primary secondary cell in unlicensed band (e.g., NR-U PSCell) may be supported. Stand-alone NR-U communication may be supported where all carriers may be in unlicensed spectrum. An NR cell with DL in unlicensed band and UL in licensed band may be supported. Dual connectivity between a primary NR cell in licensed band licensed band (e.g., NR PCell) and a primary secondary NR cell in unlicensed band (e.g., NR-U PSCell) may be supported.

Other communications corresponding to an unlicensed band (e.g., WI-FI transmissions, etc.) may be present in a band (e.g., sub-7 GHz, above-52.6 GHz, etc.) by regulation.

The band may be used for NR-U communication. The operating bandwidth for NR-U communication may be an integer multiple of 20 MHz (or any other bandwidth), for example, if other communications are present in the band corresponding to NR-U communication. LBT procedure may be performed in units of 20 MHz (or any other bandwidth), for example, at least for bands where absence of the other communications cannot be guaranteed (e.g. by regulation). Receiver assisted LBT (e.g., based on request to send (RTS)/clear to send (CTS) type mechanism) and/or on-demand receiver assisted LBT (e.g., where receiver assisted LBT is enabled if needed) may be used. Various techniques may be used to enhance spatial reuse. Preamble detection may be used for an unlicensed system.

A base station may schedule an uplink data packet (e.g., via a PUSCH) via an unlicensed carrier. The base station) may attempt to gain access to a channel for transmitting DCI (e.g., via a PDCCH) to schedule the uplink data packet. A wireless device may perform an LBT procedure prior to transmitting data packets via the PUSCH, for example, based on (e.g., in response to) receiving the DCI via the PDCCH. Receiving DCI and performing an LBT procedure may increase latency of data transmission especially if the channel is occupied by other devices (e.g., WI-FI terminals, etc.). Autonomous uplink transmission may be used to improve the latency of data transmission. A wireless device may be pre-allocated a resource for transmission (e.g., in a manner similar to UL semi-persistent-scheduling (SPS)) and may perform an LBT procedure prior to using the resource. Autonomous uplink may be based on one or more configured grants (e.g., a type 1 configured grant and/or a type 2 configured grant, etc.).

A HARQ process ID may be sent/transmitted by the wireless device (e.g., via UCI). Sending the HARQ process indicator may enable a wireless device to use a first available transmission opportunity irrespective of the HARQ process. UCI via PUSCH may be used to indicate HARQ process ID, NDI, and/or RVID, etc.

UL dynamic grant scheduled transmission, via an unlicensed band, may increase a transmission delay and/or a probability of transmission failure because of at least a first LBT procedure of a base station and a second LBT procedure of a wireless device. Pre-configured grant (e.g., configured grant in NR) may be used for NR-U communication, which may decrease the quantity of LBT procedures performed and control signaling overhead.

In type 1 configured grant, an uplink grant may be provided by RRC messaging, and may be stored as configured uplink grant. In type 2 configured grant, an uplink grant may be provided by PDCCH messaging, and stored or cleared as configured uplink grant based on L1 signaling (e.g., indicating configured grant activation or deactivation).

There need not be a dependency between HARQ process information and the timing. UCI via PUSCH may carry HARQ process ID, NDI, RVID, etc. A wireless device may autonomously select one HARQ process ID which may be indicated to a base station via UCI.

A wireless device may perform non-adaptive retransmission with the configured uplink grant. The wireless device may try to send/transmit via a next available resource with configured grant, for example, if dynamic grant for configured grant retransmission is blocked due to LBT procedure.

Downlink feedback information (DFI) may be sent/transmitted (e.g., via DCI). DFI may comprise HARQ feedback for configured grant transmission. The wireless device may perform transmission/retransmission using configured grant based on the DFI comprising the HARQ feedback. Wideband carrier with more than one channels may be supported on cell (e.g., NR-based unlicensed cell).

There may be one active BWP in a carrier. A BWP with multiple channels may be activated. LBT procedure may be performed in units of 20 MHz (or any other bandwidth), for example, if an absence of other types of communications (e.g., WI-FI communications) cannot be guaranteed (e.g. by regulation). Multiple parallel LBT procedures may be performed for the BWP. The actual transmission bandwidth may be based on subband(s) corresponding to successful LBT procedure(s). Performing multiple parallel LBT procedures may result in dynamic bandwidth transmission within an active wideband BWP.

Multiple active BWPs may be supported. The BWP bandwidth may be the same as the bandwidth of a subband corresponding to an LBT procedure to maximize BWP utilization efficiency. For example, an LBT procedure may be performed on each BWP. The network may activate/deactivate BWPs based on data volume to be sent/transmitted.

Multiple non-overlapped BWPs may be activated for a wireless device within a wide component carrier (e.g., in a manner similar to carrier aggregation used in LTE LAA). The BWP bandwidth may be the same as the bandwidth of a subband corresponding to an LBT procedure to maximize BWP utilization efficiency. For example, an LBT procedure may be performed on each BWP. The wireless device may be required to have the capability to support transmissions via multiple narrow radio frequency (RF) bands or a wide RF band (e.g., which may include multiple activated BWPs), for example, if LBT procedures are successful on more than one subband.

A single wideband BWP may be activated for a wireless device within a component carrier. The bandwidth of wideband BWP may be in the units of a subband corresponding to an LBT procedure. The wideband BWP bandwidth may consist of multiple 20 MHz bands (e.g., at 5 GHz), for example, if the subband for LBT procedure is 20 MHz. The actual transmission bandwidth may be based on subband(s) corresponding to successful LBT procedures. Transmission bandwidth based on subband(s) corresponding to successful LBT procedures may result in dynamic bandwidth transmission within an active wideband BWP.

Active BWP switching may be achieved by use of scheduling DCI. The network may indicate to the wireless device a new active BWP to use for an upcoming, and any subsequent, data transmission/reception. A wireless device may monitor multiple, configured BWPs to determine which BWP has been acquired for DL transmissions by the base station. A wireless device may be configured with a monitoring occasion periodicity and an offset for each configured BWP. The wireless device may attempt to determine if a BWP has been acquired by the base station during/for those monitoring occasions. The wireless device may use a BWP, determined to be acquired by the base station, as its active BWP. The wireless device may use the BWP as its active BWP at least until indicated otherwise or until a maximum channel occupancy time (MCOT) has been reached. The wireless device may attempt blind detection of a PDCCH in configured CORESETs and/or perform measurements on aperiodic and/or SPS resources, for example, if the wireless device determines that the BWP is active.

A wireless device may be configured with multiple UL resources (e.g., in a same BWP or in different BWPs) for UL transmissions. The wireless device may have multiple LBT configurations, with each LBT configuration tied to a BWP and/or a beam pair link. The wireless device may be granted UL resources corresponding to one or more LBT configurations. The wireless device may be configured with multiple autonomous uplink (AUL)/grant-free resources. Each AUL/grant-free resource may require the use of different LBT configurations. Providing a wireless device with multiple AUL resources over multiple BWPs may ensure that if an LBT procedure (e.g., using a first LBT configuration) fails for one AUL resource in one BWP, the wireless device may attempt transmission via another AUL resource in another BWP. Enabling the wireless device to attempt transmission via another AUL resource in another MWP may reduce the channel access latency and improve resource utilization of the unlicensed carrier.

Figure 22:
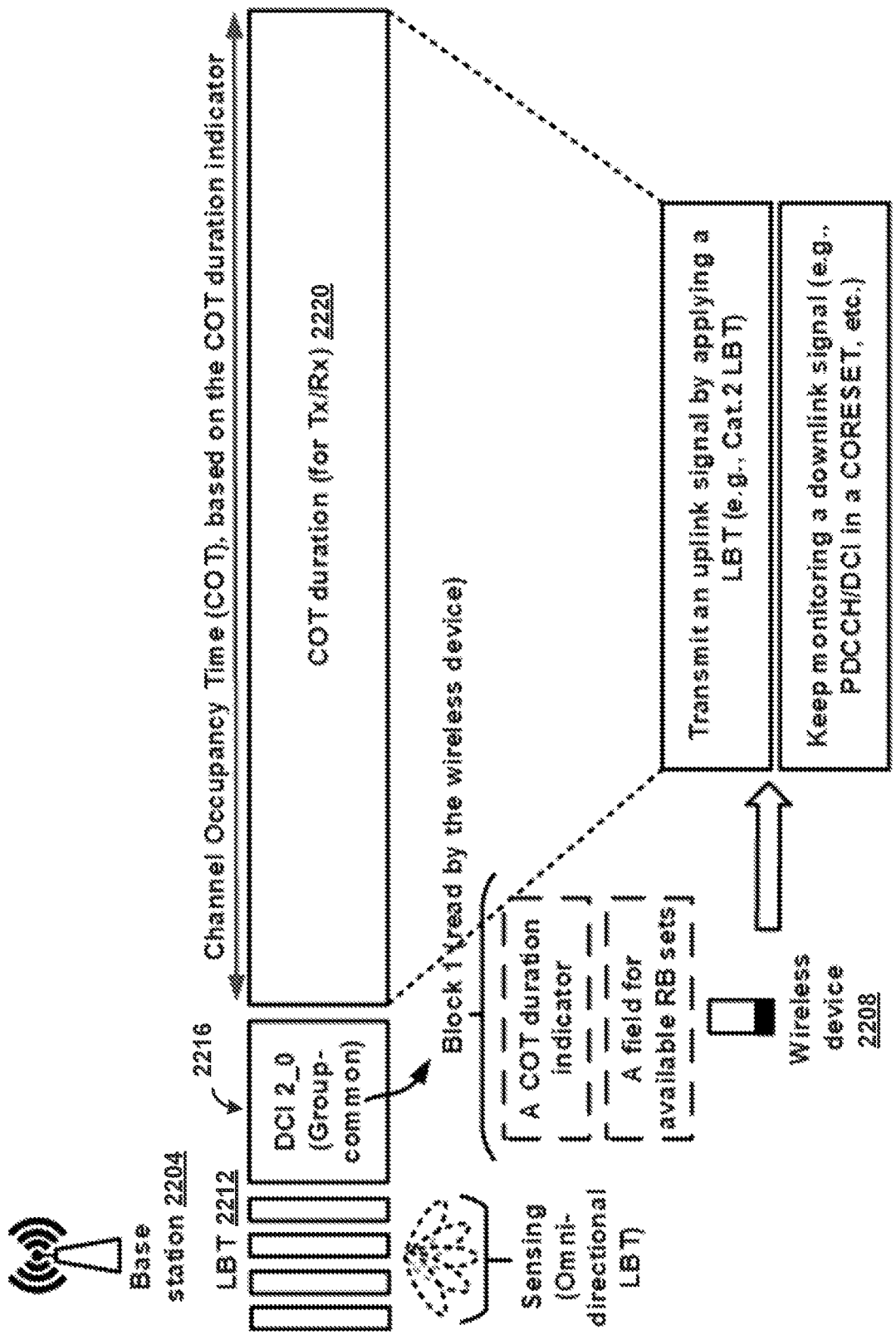
FIG. 22 shows an example communication for uplink transmission.

FIG. 22 shows an example communication for uplink transmission. The base station 2204 may perform an LBT procedure 2212 (e.g., an omni-directional LBT procedure). The base station may send/transmit (e.g., broadcast, or multicast, etc.) group-common (GC)-DCI 2216 to one or more wireless devices, for example, based on (e.g., in response to) to successful CCA based on the LBT procedure 2212. The GC-DCI 2216 may comprise a channel occupancy time (COT) duration indicator and one or more indications for available resource block (RB) sets. A wireless device 2208 may receive the GC-DCI 2216. The wireless device 2208 may determine a COT duration 2220 based on the COT duration indicator, for example, based on receiving the GC-DCI 2216. The wireless device 2208 may send/transmit an uplink signal by using a short LBT procedure within the COT duration 2220. The short LBT procedure may comprise an LBT procedure without random back-off. The wireless device may further monitor, within the COT duration 2220, a channel for a downlink signal (e.g., CORESET in PDCCH for DCI).

A base station may perform a directional LBT procedure. The base station may perform the directional LBT procedure, for example, before sending/transmitting a downlink signal (e.g., for a shared spectrum channel access in an unlicensed band (e.g., sub-7 GHz, or above-52.6 GHz, etc.)). The direction LBT procedure may use energy detection via a narrow beam (e.g., not via an omni-directional beam, etc.). The directional LBT may advantageously improve a probability of successful channel access, and enhance spatial reuse and system capacity. The base station may send/transmit (e.g., broadcast, or multicast, etc.) GC-DCI to one or more wireless devices, for example, based on (e.g., in response to) to successful CCA based on the directional LBT procedure. The GC-DCI may comprise a channel occupancy time (COT) duration indicator. A wireless device may receive the GC-DCI. The wireless device may determine a time duration based on the COT duration indicator, for example, based on receiving the GC-DCI. The wireless device may send/transmit an uplink signal by using a short LBT procedure within the time duration. The short LBT procedure may comprise an LBT procedure without random back-off.

A base station may perform a directional LBT procedure to determine a beam direction for sending a downlink signal (e.g., control information such as GC-DCI). A transmission beam direction of an uplink signal (from a wireless device) may not correspond to the determined beam direction for sending the GC-DCI (from the base station). The wireless device may perform a same LBT procedure (e.g., a short LBT) for transmission of an uplink signal, regardless of whether the transmission beam direction of the uplink signal corresponds to a beam direction of the directional LBT procedure performed by the base station. For example, the transmission beam direction of the uplink signal with the short LBT procedure might not correspond to the beam direction of the directional LBT. Mismatch between the beam directions may interfere with communications (e.g., reduced fairness of the shared spectrum channel access) in other coexisting networks in the unlicensed band (e.g., especially if a short LBT procedure is used). The base station may, to reduce the interference, configure the transmission beam direction of the uplink signal to be matched to the beam direction of the directional LBT procedure performed by the base station. A beam direction of the uplink signal that is matched to the beam direction of the directional LBT may significantly reduce a flexibility of the transmission beam management for the uplink signal and result in decreasing the spatial reuse and system capacity.

A wireless device may determine an LBT procedure type/category to be used for an uplink transmission. For example, different LBT procedure types may be associated with different durations of times for which a channel is to be sensed. Various examples herein describe configuration of LBT beam groups to assist a wireless device to determine an LBT procedure category. The wireless device may determine the LBT procedure category based on the LBT beam groups and a beam direction corresponding to the uplink transmission (e.g., RS associated with the uplink transmission). For example, the wireless device may determine to use an LBT procedure type with a shorter channel sensing time if an LBT beam group determined to be clear at the base station (e.g., based on the directional LBT procedure) corresponds to the beam direction. The wireless device may determine to use an LBT procedure type with a longer channel sensing time if an LBT beam group determined to be clear at the base station (e.g., based on the directional LBT procedure) does not correspond to the beam direction. Determination of an LBT procedure category as described herein may advantageously improve wireless device and/or network performance, for example, if a base station is configured to use a directional LBT procedure. Determination of an LBT procedure category as described herein may improve fairness of spectrum sharing and/or transmission opportunities among various communication networks in an unlicensed band. Determination of an LBT procedure category as described herein may reduce transmission latency of the uplink transmission and enable flexible transmission beam management, among other advantages.

The wireless device may receive configuration parameters indicating a plurality of LBT beam groups. Each LBT beam group may be associated with corresponding one or more RSs. An LBT beam group of the plurality of LBT beam groups may be independent (e.g., separate, or different, etc.) from a spatial domain reference (e.g., a beam reference, spatialRelationInfo, a TCI state, or an SRI, etc.) indicating the one or more RSs. An LBT procedure (e.g., a directional LBT procedure) may be performed based on the LBT beam group. A determination of a transmission beam (e.g., a spatial domain filter, etc.) for a signal may be performed based on the one or more RSs. The wireless device may determine an RS for transmission of an uplink signal. A spatial domain filter (e.g., a beam) for transmission of the uplink signal may be determined based on the RS. The wireless device may receive a control command indicating an LBT beam group. The wireless device may determine whether the RS associated with the uplink signal is associated with the LBT beam group. The wireless device may determine a selective LBT type/category to be used for transmission of the uplink signal, for example, based on determining whether the RS associated with the uplink signal is associated with the LBT beam group.

Figure 23:
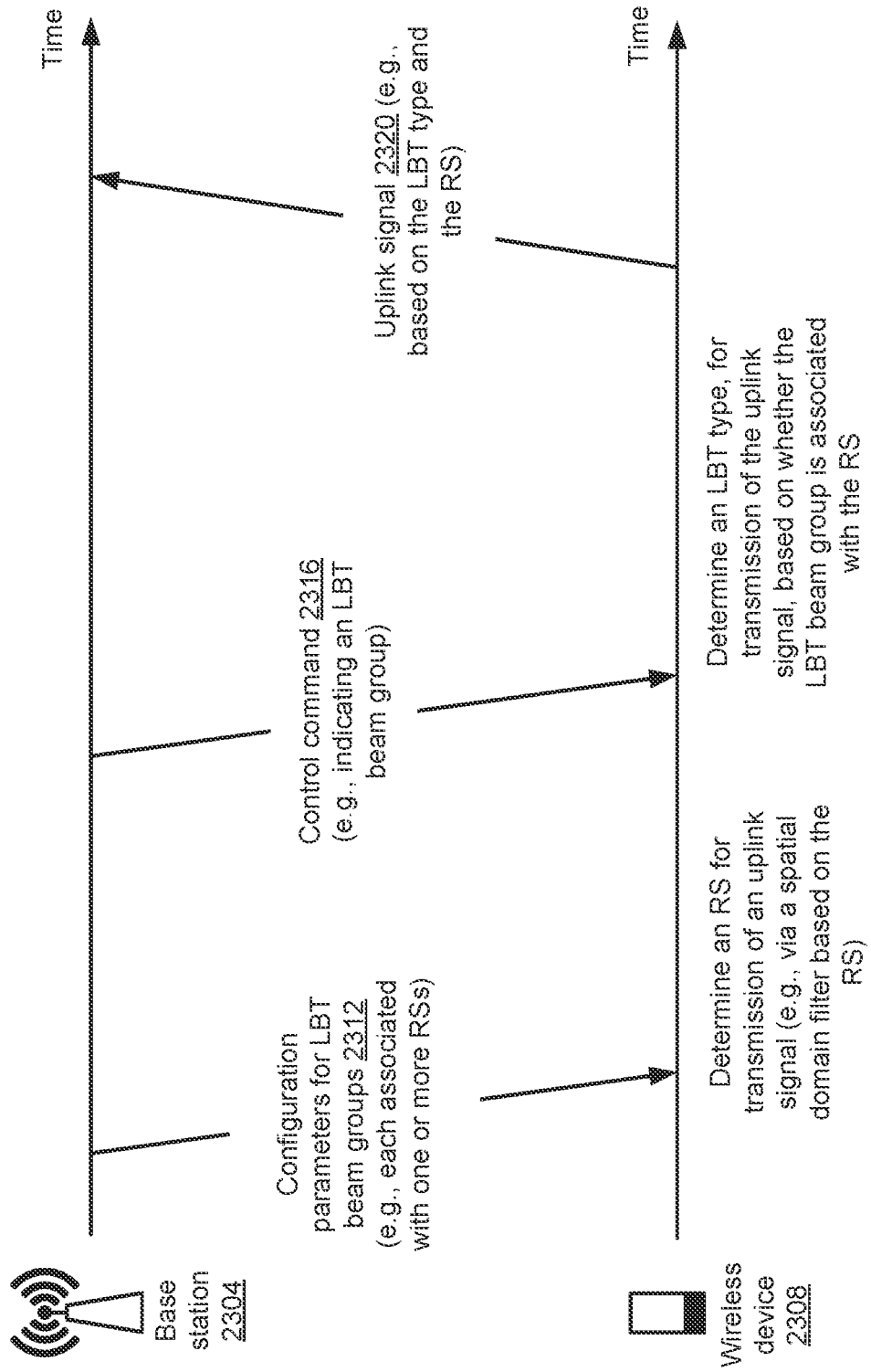
FIG. 23 shows an example communication for uplink transmission.

FIG. 23 shows an example communication for uplink transmission. A base station may associate a plurality of RS signals to a plurality of LBT beam groups (e.g., via configuration parameters, as further described with respect to FIGS. 24 and 25). The base station 2304 may send an indication of an LBT beam group, among the plurality of LBT beam groups, to a wireless device 2308. The wireless device 2308 may determine an LBT procedure type/category to be used based on the LBT beam group and an RS (e.g., beam) associated with an uplink signal from the wireless device 2308. The indicated LBT beam group may be associated with/comprise one or more RSs. The one or more RSs may or may not include the RS. The wireless device may determine the LBT procedure type/category based on whether the one or more RSs includes the RS.

The wireless device 2308 may receive (e.g., from the base station 2304 or from a second wireless device, etc.), one or more messages comprising configuration parameters 2312. The configuration parameters 2312 may indicate a plurality of LBT beam groups. Each LBT beam group of the plurality of LBT beam groups may be associated with corresponding one or more RS s.

The wireless device 2308 may determine a direction for transmission of an uplink signal. The direction may be determined based on an RS. For example, the wireless device may send/transmit an uplink signal (e.g., uplink signal 2320) using a spatial domain filter (e.g., a beam). The spatial domain filter may be determined based on the RS. The one or more messages may comprise a parameter of configuring (e.g., activating, updating, or indicating, etc.) the RS for the uplink signal. The RS may be used as a spatial domain reference (e.g., a beam reference, etc.) for determining the spatial domain filter for the uplink signal. The RS may comprise/indicate at least one of: an SSB (e.g., indicated by an SSB indicator/index), a CSI-RS (e.g., CSI-RS resource), an SRS (e.g., SRS resource), and/or a DMRS. The SSB may be configured for radio resource management (RRM), radio link monitoring (RLM), beam management, CSI feedback/reporting, and/or pathloss reference, etc. The CSI-RS may be configured for RRM, RLM, beam management, CSI feedback/reporting, tracking (e.g., as a tracking RS (TRS)), and/or pathloss reference, etc. The SRS may be configured for beam management, antenna switching, codebook-based uplink, and/or non-codebook-based uplink, etc. The parameter may indicate spatial relation information (SPRI) (e.g., spatialRelationInfo, or PUCCH-SpatialRelationInfo, etc.) via RRC signaling. The SPRI may indicate the RS. The parameter may indicate (e.g., activate, or update, etc.), via a MAC CE (or DCI), a second SPRI. The second SPRI may indicate a second RS for the uplink signal. The parameter may indicate a TCI state (e.g., a downlink TCI state, an uplink TCI state, a unified downlink/uplink TCI state, etc.) via an RRC signaling, The TCI state may indicate the RS. The parameter may indicate (e.g., activate, or update, etc.), via a MAC-CE (or DCI), a second TCI state. The second TCI state may indicate a second RS for the uplink signal. The parameter may indicate an SR) (e.g., if the uplink signal is a PUSCH transmission). The SRI may indicate the RS. An LBT beam group, of the plurality of LBT beam groups, may be independent (e.g., separate, or different, etc.) from the spatial domain reference (or the beam reference, etc.). The LBT beam group may correspond to a first angular domain area (e.g., a target area) for a directional LBT procedure performed by the base station 2304. The spatial domain reference (or the beam reference, etc.) may correspond to a second angular domain area (e.g., a target area) for transmission of an uplink signal. The first angular domain area may be independent (e.g., separate, or different, etc.) from the second angular domain area. The first angular domain area may be larger than the second angular domain area. The first angular domain area may cover (e.g., comprise, contain, include, be a super set of, at least partially cover, or largely cover, etc.) the second angular domain area and a third angular domain area. The third angular domain area may correspond to a third spatial domain reference. The uplink signal may comprise a PUSCH transmission, a physical uplink control channel PUCCH transmission, an SRS, a DMRS, and/or a PRACH transmission, etc. The one or more messages may comprise RRC messages. The one or more messages may comprise MAC CE messages.

The wireless device 2308 may receive a message (e.g., control command 2316, control information). The control command 2316 may indicate an LBT beam group of the plurality of the LBT beam groups. The indicated LBT beam group may correspond to be an LBT beam group determined to be cleared (e.g., using CCA) by the base station 2304 (e.g., determined to available at the base station). The base station 2304 may send the control command 2316 based on performing a successful CCA based on a directional LBT procedure (e.g., on the LBT beam group of the plurality of LBT beam groups). The LBT beam group, indicated by the control command 2316, may correspond to beam direction (s) associated with the successful CCA. For example, the base station may perform directional LBT procedures on each of the plurality of LBT beam groups. The base station, based on the performing, may determine a successful CCA of a directional LBT procedure on the LBT beam group of the plurality of LBT beam groups. The control command 2316 may be a dedicated control message (e.g., wireless device-specific DCI, user-specific DCI, a wireless device-specific MAC-CE command, etc.) for the wireless device 2308. The control command 2316 may be a group common (GC) control message (e.g., GC-DCI, broadcast DCI, multicast DCI, broadcast MAC CE command, or a multicast MAC-CE command, etc.). The GC control message may be sent/transmitted to one or more wireless devices. The GC control message may indicate a COT duration (e.g., in addition to indicating the LBT beam group). Various examples herein may improve an LBT beam indication flexibility, for example, by grouping of one or more RSs (e.g., beams) with an LBT beam group. The indication of the LBT beam group by the control command may simultaneously indicate more than one RSs associated with the LBT beam group. The configuration parameters for the grouping may flexibly associate an LBT beam group with a plurality of RSs.

The wireless device 2308 may determine an LBT type (e.g., channel access procedure type, LBT procedure type) for transmission of an uplink signal 2320. The wireless device 2308 may determine an LBT type, for example, based on (e.g., in response to) receiving the control command 2316. The wireless device 2308 may determine an LBT type, for example, based on whether the LBT beam group (e.g., indicated by the control command 2316) is associated with the RS (e.g., as determined by the wireless device for transmission of the uplink signal 2320). The LBT type may be a first LBT type, for example, based on the RS being associated with the LBT beam group. The first LBT type may correspond to an LBT procedure without random back-off (e.g., an LBT type without contention, an LBT type without an applied contention window, a short LBT type, or a short-term LBT category, category 2 LBT, etc.). The LBT type may be a second LBT type, for example, based on the RS not being associated with the LBT beam group. The second LBT type may correspond to an LBT procedure with random back-off (e.g., an LBT type with random back-off with a contention window of fixed size, an LBT type with random back-off with a contention window of variable size, an LBT type with contention, a long LBT type, or a long-term LBT category, category 4 LBT, etc.). An RS being associated with an LBT beam group may comprise that an angular domain area associated with the RS is within an angular domain area associated with the LBT beam group.

The wireless device 2308 may determine not to use an LBT procedure for transmitting the uplink signal 2320, for example, based on the RS being associated with the LBT beam group (e.g., indicated by the control command 2316). The wireless device 2308 may determine to use an LBT procedure (e.g., an LBT type without random backoff, an LBT type without contention, an LBT type without an applied contention window, a short LBT type, or a short-term LBT category, category 2 LBT, etc.), for example, based on the RS being associated with the LBT beam group (e.g., indicated by the control command 2316).

The wireless device 2308 may send/transmit the uplink signal 2320. The wireless device 2308 may send/transmit the uplink signal 2320 within an indicated COT. The wireless device 2308 may send/transmit the uplink signal 2320, for example, based on the LBT type (e.g., using an LBT procedure corresponding to the LBT type) and the RS. The wireless device 2308 may determine a spatial domain filter (e.g., a transmission spatial domain filter, a transmission beam, a transmission analog beam, a transmission digital beam, or a transmission hybrid analog/digital beam, etc.) for transmission of the uplink signal, for example, based on the RS associated with the uplink signal 2320. The wireless device 2308 may determine the LBT type for the uplink signal, for example, based on (e.g., in response to) receiving the control command 2316 indicating the LBT beam group and based on determining whether the LBT beam group is associated with the RS. The wireless device 2308 may perform an LBT procedure (e.g., a pre-defined LBT procedure, a pre-configured LBT procedure, or a channel sensing procedure based on an energy detection threshold, etc.) based on the LBT type, for example, before transmitting the uplink signal 2320. The LBT procedure may be performed in spatial domain (e.g., an angular domain, an angular space, or a directional area) based on the LBT beam group indicated by the control command. The LBT procedure may comprise a directional LBT procedure (e.g., not an omni-directional LBT, not a quasi-omni-directional LBT, or an indicated-direction-based LBT procedure according to the LBT beam group, etc.). The wireless device 2308 may transmit the uplink signal 2320 using the spatial domain filter (e.g., determined based on the RS), based on (e.g., according to, following, or after) performing the LBT procedure according to the LBT type. The wireless device 2308 may transmit the uplink signal 2320, for example, based on (e.g., after or in response to) determining that the channel is idle or clear, a successful CCA, or determining an energy level based on the LBT procedure is below the energy detection threshold, etc. Uplink signal transmission as described herein may improve transmission opportunity availability and/or reduce latency of the uplink signal (e.g., within an indicated COT), for example, based on the wireless device 2308 determining to use the first LBT type (e.g., the RS of the uplink signal being associated with the indicated LBT beam group). Uplink signal transmission as described herein may improve fairness of channel/transmission opportunity availabilities among various other communication networks in an unlicensed band (e.g., for shared spectrum channel access), for example, based on the wireless device 2308 determining to use the second LBT type (e.g., the RS, for transmission of the uplink signal, not being associated with the indicated LBT beam group).

Figure 24:
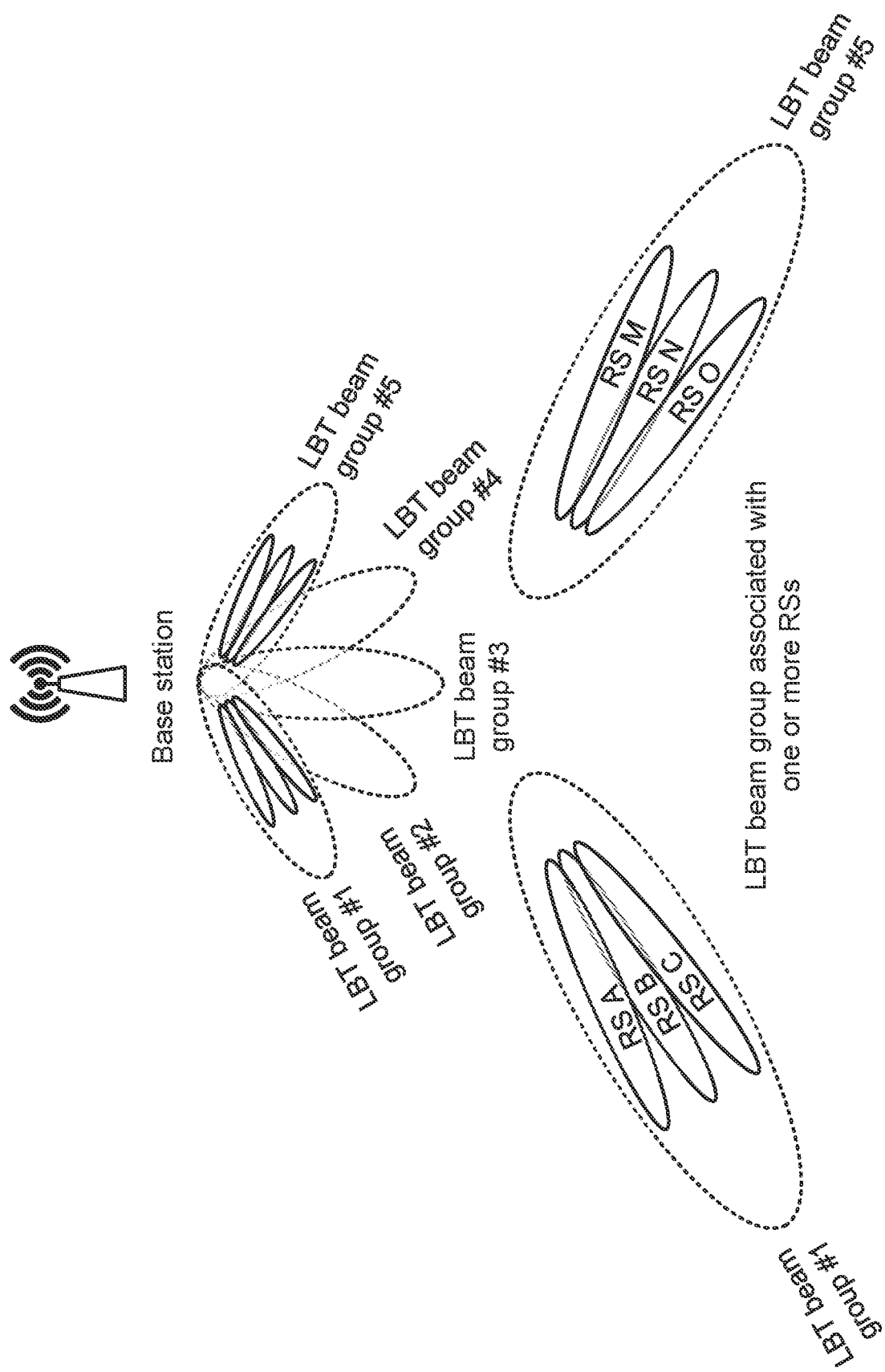
FIG. 24 shows an example of how different LBT beam groups may be associated with different sets of RSs.

FIG. 24 shows an example of how different LBT beam groups may be associated with different sets of RS s. A base station may determine a quantity of LBT beam groups to be used to communicate with a plurality of wireless devices. For example, as shown in FIG. 24, the base station may determine that 5 LBT beam groups (e.g., LBT beam group #1, LBT beam group #2, LBT beam group #5) are to be used to communicate with the plurality of wireless devices. Each LBT beam group may have its own association with one or more RSs of a plurality of RSs. The LBT beam group #1 may be associated with RS A, RS B, and RS C. The configuration parameters indicating this association (e.g., the configuration parameters 2312), may be sent/transmitted (e.g., by the base station) to a first group of wireless devices of the plurality of wireless devices. The LBT beam group #5 may be associated with RS M, RS N, and RS 0. The configuration parameters indicating this association (e.g., the configuration parameters 2312) may be transmitted (e.g., by the base station) to a second group of wireless devices of the plurality of wireless devices. The base station may independently configure the first group and the second group, where some wireless devices in the first group may also belong to the second group. LBT beam grouping flexibility may be improved based on the association between each LBT beam group and one or more RSs of the plurality of RSs being independent. The association may be indicated (e.g., by the configuration parameters) to a group of wireless devices of the plurality of wireless devices, for example, based on an efficient network operation strategy determined by the base station.

An LBT beam group, of the plurality of LBT beam groups, may be associated (e.g., assigned, attached, or tagged, etc.) with an indicator/index of LBT beam group. A first index of LBT beam group may be (directly or explicitly) configured, associated, or assigned (e.g., as a sub-parameter), via one or more configuration, parameters for the uplink signal. The wireless device may determine to use an LBT beam group, corresponding to the first index, for transmission of the uplink signal. The control command may indicate an LBT beam group (e.g., via indicating a second index of LBT beam group). The LBT group, corresponding to the second index, may be an LBT beam group determined to be available for communication (e.g., via CCA at the base station). The wireless device may determine, an LBT type, for transmission of the uplink signal based on receiving the control command (e.g., as described with respect to FIG. 23), for example, based on whether the first index of LBT beam group (configured, associated, or assigned for the uplink signal) and the second index of LBT beam group (indicated by the control command) are same. The LBT type may be the first LBT type, for example, based on (e.g., in response to) determining that the first index and the second index are same. The LBT type may be the second LBT type, for example, based on (e.g., in response to) determining that the first index and the second index are different. Various examples herein may improve a flexibility in associating an RS and an LBT beam group for an uplink signal. An index of LBT beam group may be configured, associated, or assigned (e.g., as a sub-parameter) for the uplink signal and be (directly) used for comparing an LBT beam group indicated by a control command to further determine an LBT type for the uplink signal.

Figure 25:
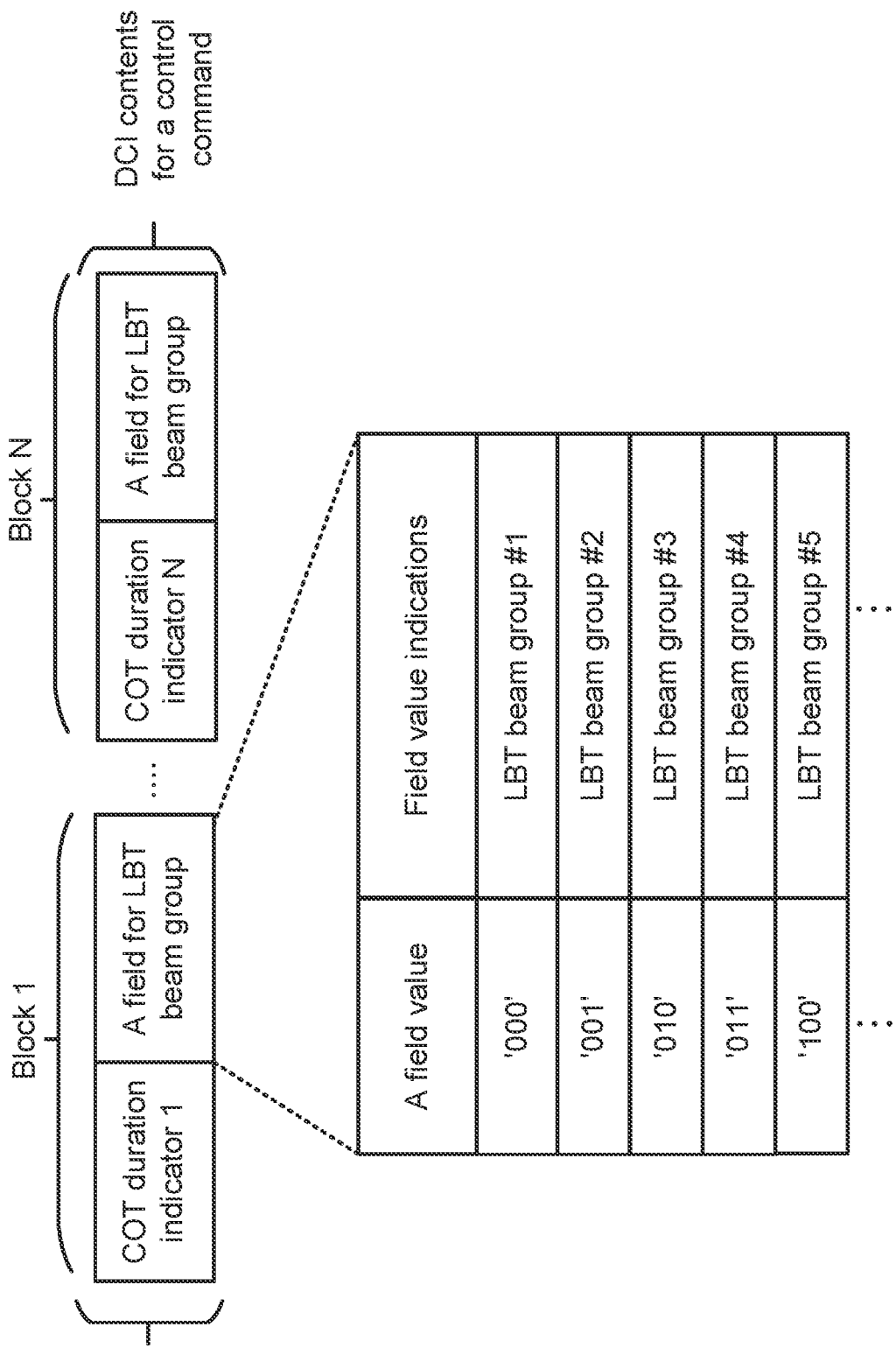
FIG. 25 shows an example format of a message.

FIG. 25 shows an example format of a message. The message may be a control command (e.g., the control command 2316 as described with respect to FIG. 23). The control command may comprise at least an indication of an LBT beam group. The indicated LBT beam group may be an LBT beam group determined to be clear for communication (e.g., by the base station based on CCA). The control command may comprise a field for indicating an LBT beam group. A first field value (e.g., 000) of the field may indicate a first LBT beam group (e.g., LBT beam group #1), a second field value (e.g., 001) of the field may indicate a second LBT beam group (e.g., LBT beam group #2), etc. The one or more messages (e.g., as described with respect to FIG. 23) may comprise one or more configuration parameters for the field value indications of the control command. The control command may be GC-DCI, where the DCI contents for the control command may comprise one or more blocks (e.g., block 1, . . . , block N). Each block may be associated with corresponding one or more wireless devices. Each block of the one or more blocks may comprise at least the indication of an LBT beam group. A block of the one or more blocks may further comprise a COT duration indicator (e.g., COT duration indicator 1 for block 1, . . . , COT duration indicator N for block N). The COT duration indicator may indicate a time duration. The time duration may be upper bounded by a maximum value (e.g., a maximum COT (MCOT)). The maximum value may be based on a regulation for an unlicensed band. A block of the one or more blocks may be associated (e.g., comprised, indicated, or configured, etc.) with a unit (or granularity) of frequency resource. The unit of frequency resource may comprise a cell (e.g., a component carrier, a serving cell, or a cell associated with a cell indicator/ID, etc.), a set of cells (e.g., a cell group, etc.), a BWP of a cell, a subband (or channel, e.g., based on a regulation or channelization depending on a specific region), and/or may be based on a pre-defined granularity of frequency resource. The time duration based on the COT duration indicator may be applied for the unit (e.g., a first cell with a cell ID, e.g., ServCellIndex, etc.). The indication of an LBT beam group may further be associated with a second unit of frequency resource (e.g., a cell, a component carrier, a serving cell, or a cell associated with a cell ID (e.g., ServCellIndex, etc.)). The LBT beam group corresponding to the indication may be applied for the second unit of frequency resource (e.g., a second cell). The first cell associated with the COT duration indicator and the second cell associated with the LBT beam group may be the same and may be indicated by the control command.

The LBT type for transmission of an uplink signal (e.g., as described with respect to FIG. 23), determined based on receiving the control command, may be applied for (e.g., during) the time duration corresponding to the COT duration indicator. The wireless device may send/transmit the uplink signal within (e.g., during) the time duration, for example, by applying the LBT type determined based on receiving the control command. The wireless device may transmit the uplink signal via a first cell (e.g., a component carrier, a serving cell, or a cell associated with a cell ID, etc.) which may be associated with a second cell indicated by the control command, for example, within (e.g., during) the time duration based on the COT duration indicator. The first cell may be determined as being the same as the second cell indicated by the control command. The one or more messages may further comprise a parameter for an association between the first cell and the second cell, where the second cell is indicated by the control command. Various examples herein may improve transmission efficiency by reducing a latency of transmission of the uplink signal within (e.g., during) the time duration based on the COT duration indicator. The latency may be reduced by applying the LBT type, for the uplink signal, that is determined based on the LBT beam group indicated by the control command. For example, the wireless device may use a short LBT (e.g., with a deterministic/reduced channel sensing time) if the LBT beam group indicated by the control command is associated with a RS for transmission of the uplink signal.

A block of the one or more blocks may further comprise a field indicating available RB sets (e.g., indicated (or configured) by higher layer parameter AvailableRB-SetsPerCell-r16). The field may be associated with a third cell (e.g., as the unit of a frequency resource) with a corresponding cell indicator/ID (e.g., ServCellIndex, etc.). The third cell may comprise a plurality of RB sets. The field indicating available RB sets may comprise a bitmap. Each bit of the bitmap may correspond to an RB set, of the plurality of RB sets, and may indicate whether the RB set is available for communication (e.g., at least until the end of the time duration corresponding to a COT duration indicator). The first cell associated with the COT duration indicator and the third cell associated with the field for available RB sets may be the same and may be indicated by the control command. The second cell associated with the LBT beam group and the third cell associated with the field for available RB sets may be the same and may be indicated by the control command. The LBT beam group indicated by the control command may be applicable for the one or more RB sets (e.g., indicated as being available by the bitmap). The first cell associated with the COT duration indicator, the second cell associated with the LBT beam group, and the third cell associated with the field for available RB sets may be the same and indicated by the control command. The LBT beam group (e.g., indicated by the control command) may be applicable on the one or more RB sets (e.g., indicated as being available by the bitmap) within the time duration (e.g., based on the COT duration indicator). The wireless device may determine the LBT type for transmission of an uplink signal as being the first LBT type (e.g., as described with respect to FIG. 23), for example, based on determining that the one or more RB sets (e.g., indicated as being available by the bitmap) fully (or partially, or according to a pre-defined/pre-configured rule, etc.) spans (e.g., covers, includes, or comprises) one or more RBs allocated for transmission of the uplink signal. The wireless device may determine that the LBT type for transmission of an uplink signal is the first LBT type, for example, based on determining that one or more second RB sets (e.g., for uplink transmission), associated (e.g., by a pre-defined or pre-configured rule, etc.) with the one or more RB sets indicated as being available by the bitmap fully (or partially, or according to a pre-defined or pre-configured rule, etc.) spans (e.g., covers, includes, or comprises, etc.) one or more RBs allocated for transmission of the uplink signal. The wireless device may transmit the uplink signal within the time duration by applying the LBT type determined based on receiving the control command.

The one or more blocks need not explicitly be comprised in the control command. The wireless device may (e.g., implicitly) determine a block (e.g., a virtual block, an implicit block, information content, etc.) that comprises at least one of a field for LBT beam group, a COT duration indicator, and a field indicating available RB sets The LBT beam group, the COT duration indicator, and the field indicating the available RB sets may be associated with the same unit of frequency resource (e.g., the same cell with the same cell ID (e.g., ServCellIndex), etc.) or may be commonly associated with a single cell ID (e.g., ServCellIndex, etc.) at a time. Control command configuration as described herein may improve flexibility of frequency domain resource allocation (e.g., based on a field indicating available RB sets and the associated unit of frequency resource in the control command), and reduce a latency of transmission of the uplink signal within the time duration. A latency may be reduced by applying the LBT type for the uplink signal determined based on the LBT beam group indicated by the control command. For example, a short LBT (e.g., with deterministic/reduced channel sensing time) may be applied if the LBT beam group indicated by the control command is associated with RS for transmission of the uplink signal.

The LBT type determined for transmission of an uplink signal (e.g., as described with respect to FIG. 23, FIG. 24, and FIG. 25), may be overridden (e.g., re-determined, updated, or overridden as an exception case), by the wireless device. Overriding a determined LBT type may comprise using an LBT type different from a determined LBT type (e.g., as described with respect to FIGS. 23-25). The determined LBT type may be overridden with a third LBT type indicated (e.g., explicitly indicated, or implicitly determined by a pre-defined/pre-configured rule, etc.), during the time duration. The LBT type may be different from the third LBT type. The third LBT type may be either the first LBT type or the second LBT type. The third LBT type may be indicated, to the wireless device, via a third control command indicating the third LBT type. The third control command may comprise a field (e.g., ChannelAccess-CPext field) and the third LBT type may be determined based on the field. Determination of an LBT type based on a control command and overriding the determined LBT type with another LBT type may improve a system operation efficiency by reducing a signaling overhead for indicating the LBT type to a wireless device. The LBT type, determined based on a RS associated with the uplink signal and the indicated LBT beam group, may be a default LBT type to be used (e.g., applied, etc.) within the time duration, unless the third LBT type is further indicated to the wireless device within the time duration.

A hierarchical method may be used for determination of an LBT type where different LBT types may be categorized into LBT type groups, and an LBT type group may be selected in accordance with various considerations described herein. A combination of RRC signaling and a dynamic signaling (e.g., MAC CE or DCI) may be used for LBT type indication for one or more uplink channel/signal. A base station may send/transmit, to the wireless device, one or more RRC messages. The one or more RRC messages may comprise configuration parameters of a plurality of LBT types (e.g., in an LBT type group). The LBT type group may be associated with an LBT beam group. The LBT type determined for transmission of an uplink signal (e.g., based on an RS associated with the uplink signal and the indicated LBT beam group) may be an LBT type group (e.g., an LBT type classification, an LBT type categorization, or an intermediate group of LBT types, etc.). A further indication for a final LBT type to be applied to the uplink signal may be signaled. The wireless device may receive a message (e.g., a command, DCI, or an uplink data scheduling grant, etc.) comprising an indication of a final LBT type, within the LBT type group, to be applied to the uplink signal. The hierarchical method (e.g., determination of the LBT type group and an indication of the final LBT type) may improve an LBT type indication flexibility and may reduce a signaling overhead for the control command.

Figure 26:
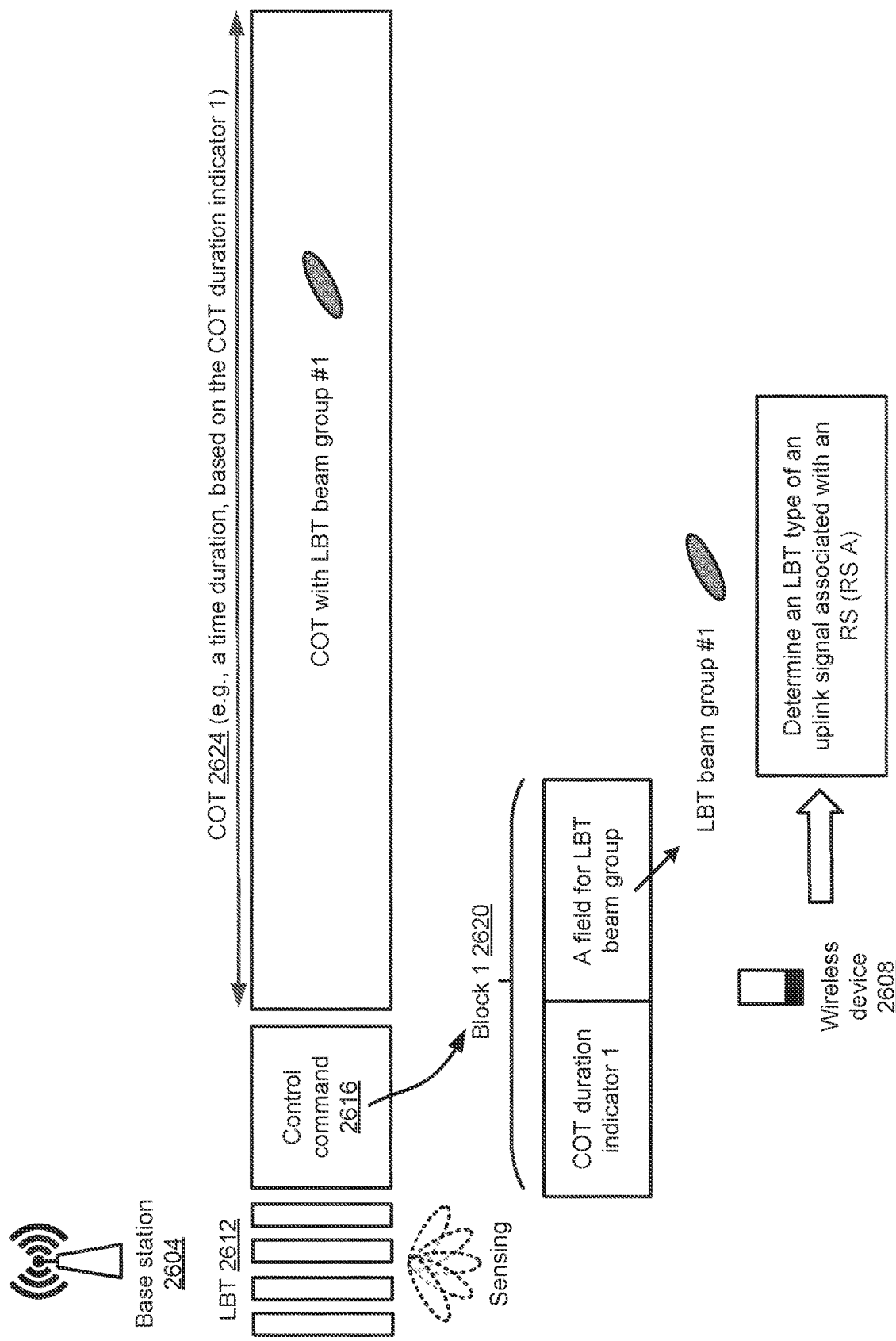
FIG. 26 shows an example communication for an uplink transmission.

FIG. 26 shows an example communication for an uplink transmission. The example communication may be based on an indication of an LBT beam group (e.g., determined by a base station 2604 based on a directional LBT procedure). A wireless device 2608 may determine an LBT type for an LBT procedure to be used for the uplink transmission, for example, based on the LBT beam group and a beam (e.g., corresponding to an RS) associated with the uplink transmission.

The wireless device 2608 may receive (e.g., from the base station 2604) one or more messages indicating an association, between a plurality of LBT beam groups and a plurality of RS s, and field value indications of a control command (e.g., as described with respect to FIG. 23, FIG. 24, and FIG. 25). The base station may perform an LBT procedure 2612 (e.g., a directional LBT procedure, as described with respect to FIG. 23) by sensing a wireless channel. The base station may sense a wireless channel in a direction based on an LBT beam group of the plurality of LBT beam groups, for example, before transmitting a message (e.g., a control command 2616). The base station 2304, based on the LBT procedure 2612, may determine that the wireless channel is idle or clear in the direction corresponding to a first LBT beam group (e.g., LBT beam group #1). The base station 2304 may determine that the wireless channel is idle or clear in the direction corresponding to a first LBT beam group, for example, based on a successful CCA or based on determining that an energy level in the direction is below an energy detection threshold.

The base station may send/transmit the control command 2616, for example, based on the determination that the wireless channel is idle or clear in the direction of LBT beam group #1. The base station may send/transmit the control command 2616 if the base station determines that the wireless channel is idle or clear in the direction of LBT beam group #1. The control command may at least indicate/comprise a first block (e.g., block 1). The block 1 may comprise a COT duration indicator 1 and a field for LBT beam group indicating the LBT beam group #1). The one or more messages, may further comprise an indication of a position of a block, within the control command 2616, corresponding to the wireless device 2608. The wireless device 2608 may determine to read/decode block 1 of the control command 2616, for example, based on the one or more messages indicating that the block 1 is to be read/decoded. The wireless device 2608 may determine an LBT type of an uplink signal associated with a first RS (e.g., RS A) (e.g., as described with respect to FIG. 23, FIG. 24, and FIG. 25), for example, based on receiving the control command and reading (e.g., determining, decoding, or receiving) block 1. The base station 2604 may flexibly determine one or more LBT beam groups, of the plurality of LBT beam groups, to be used (e.g., selected, determined, or applied, etc.) for performing the LBT procedure. The base station may not necessarily perform the LBT procedure over all the plurality of LBT beam groups, but the base station may selectively perform the LBT procedure over the one or more LBT beam groups of the plurality of LBT beam groups. Selectively performing the LBT procedure over one or more LBT beam groups of the plurality of LBT beam groups may improve an efficiency of a network operation. For example, various factors including wireless channel quality conditions, data traffic conditions, or interference coordination aspects, etc., across different LBT beam groups of the plurality of LBT beam groups may be considered for selecting the one or more LBT beam groups.

Figure 27:
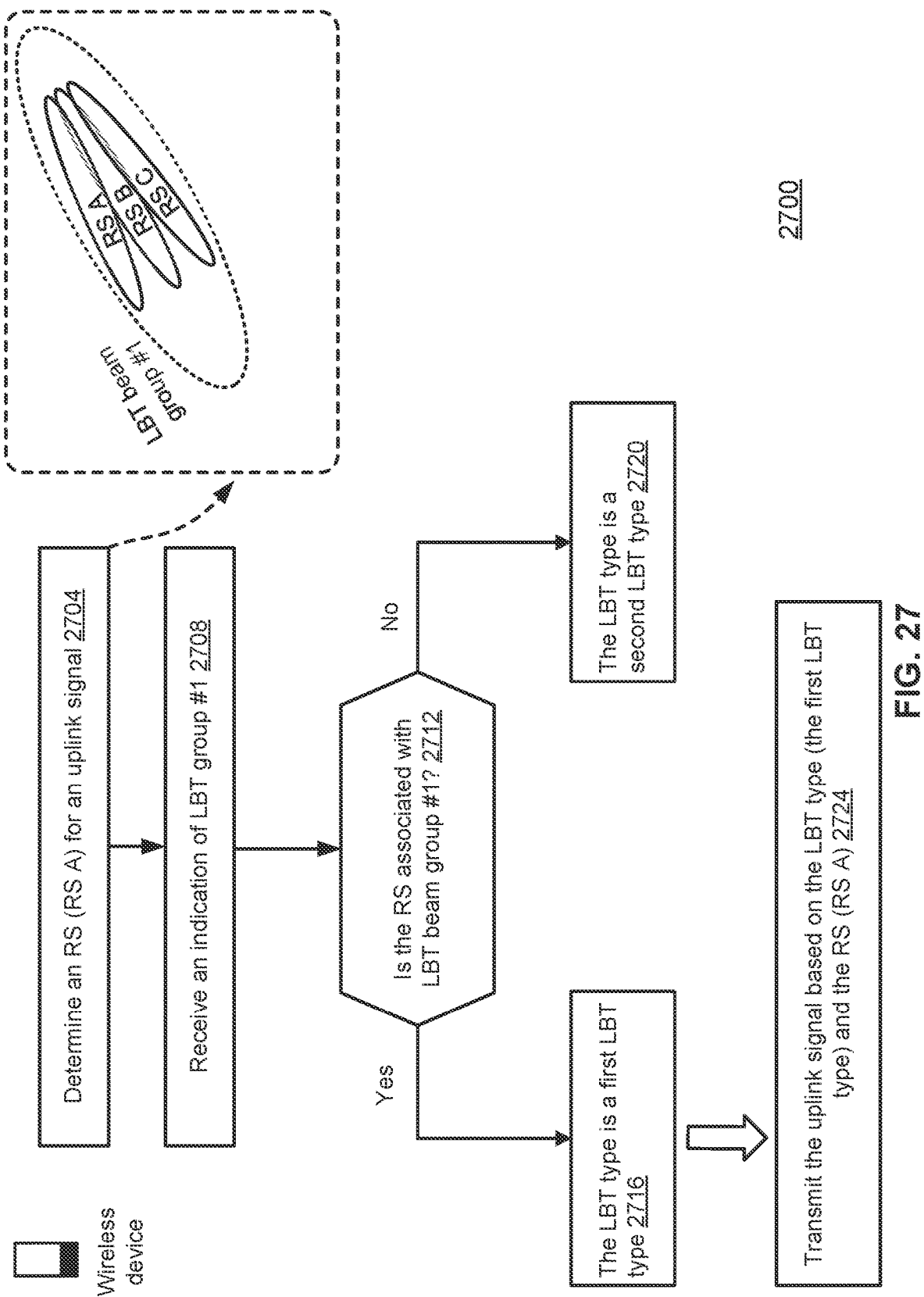
FIG. 27 shows an example method for determination of an LBT procedure type.

FIG. 27 shows an example method for determination of an LBT procedure type. The example method 2700 may be performed by a wireless device. The example method 2700 for LBT type determination may be based on a RS associated with an uplink signal and an LBT beam group indicated by a control command. The example method 2700 describes an example scenario where an RS, associated with an uplink signal, is associated with an LBT beam group indicated by the control command.

At step 2704, the wireless device may determine an RS (e.g., a first RS, RS A) for an uplink signal. For example, the wireless device may receive the parameter configuring (e.g., activating, updating, or indicating, etc.) a first RS (e.g., RS A) for an uplink signal. The RS may be used for determining a spatial domain filter (e.g., beam) for the uplink signal (e.g., as described with respect to FIG. 23). At step 2708, the wireless device may receive an indication of an LBT group #1 (e.g., indicating that the LBT group #1 is clear). For example, the wireless device may receive a control command indicating block 1 for the wireless device, and the block 1 may at least indicate the LBT beam group #1 (e.g., as described with respect to FIG. 26). The wireless device may receive the indication of LBT group #1, for example, before or after determining the RS for the uplink signal. The wireless device may (e.g., based on receiving the control command) determine an LBT type, for transmission of the uplink signal. The wireless device may determine the LBT type, based on whether the first RS (RS A) is associated with the LBT group #1 (e.g., step 2712). At step 2716, the wireless device may determine to use a first LBT type, for example, if the RS A is associated with the LBT group #1. At step 2720, the wireless device may determine to use a second LBT type, for example, if the RS A is not associated with the LBT group #1. The wireless device may determine that the RS A is associated with LBT beam group #1, for example, based on the configuration parameters indicating that LBT beam group #1 is associated with RS A, RS B, and RS C (e.g., as described with respect to FIG. 24). The wireless device may determine the LBT type for transmission of the uplink signal is the first LBT type, for example, based on the determination that the RS A is associated with LBT beam group #1 (e.g., as described with respect to FIG. 23). At step 2724, the wireless device may send/transmit the uplink signal based on the LBT type (e.g., the first LBT type) and the RS A. Using the first LBT type based on an association between the LBT group #1 and the RS A may improve a transmission opportunity availability and reduce latency of the uplink signal (e.g., within a COT indicated by the control command.

Figure 28:
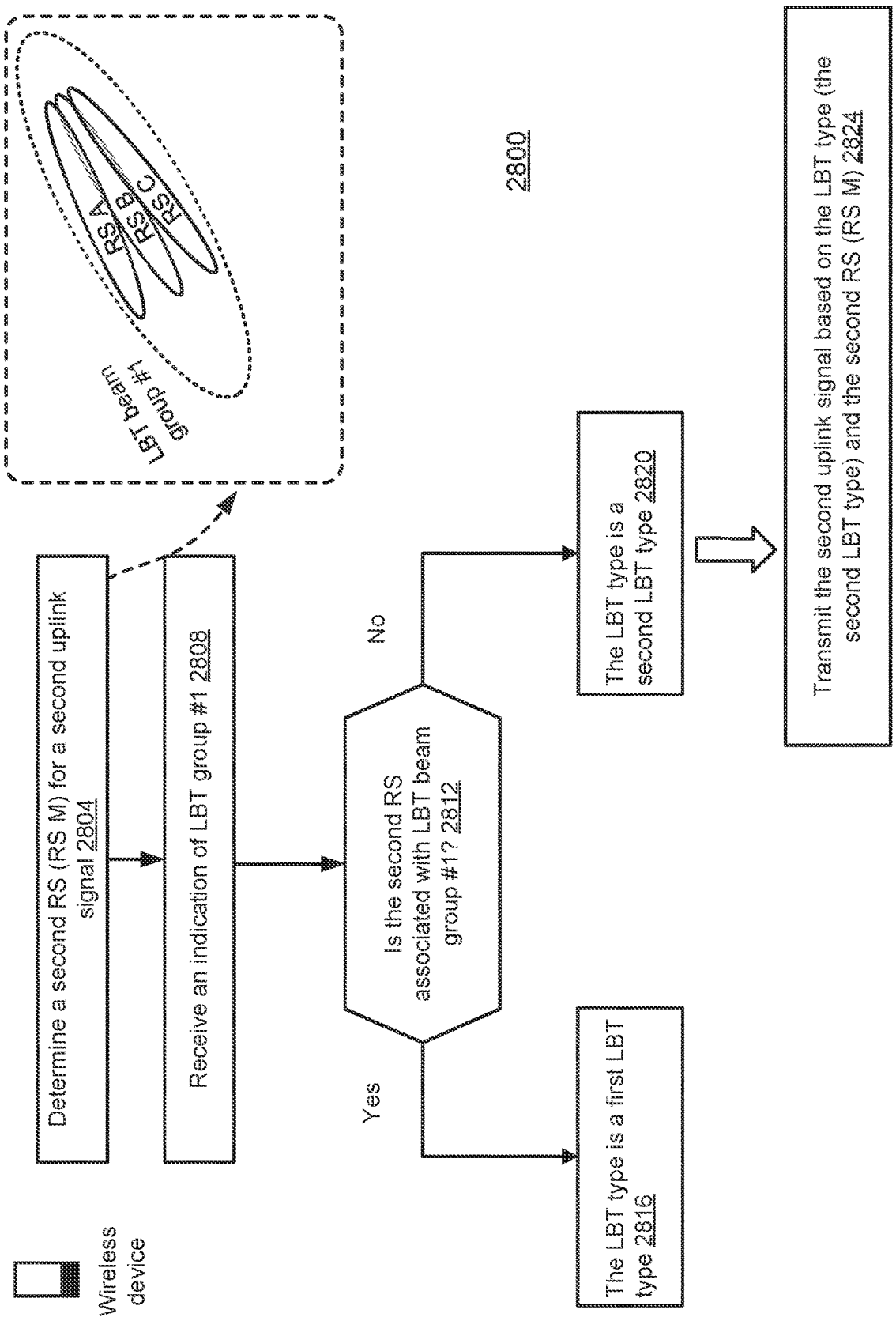
FIG. 28 shows an example method for determination of an LBT procedure type.

FIG. 28 shows an example method for determination of an LBT procedure type. The example method 2800 may be performed by the wireless device. The example method 2800 describes an example scenario where an RS, associated with an uplink signal, is not associated with an LBT beam group indicated by the control command.

At step 2804, the wireless device may determine an RS (e.g., a second RS, RS M) for a second uplink signal. For example, the wireless device may receive a second parameter of configuring (e.g., activating, updating, or indicating, etc.) a second RS (e.g., RS M) for the second uplink signal. The second RS may be used for determining a second spatial domain filter (e.g., a second beam) for the second uplink signal. At step 2808, the wireless device may receive an indication of an LBT group #1. For example, the wireless device may receive a control command indicating a block 1 for the wireless device, and the block 1 may at least indicate the LBT beam group #1. The wireless device may (e.g., based on receiving the control command) determine an LBT type, for transmission of the second uplink signal. The wireless device may determine the LBT type, for example, based on whether the second RS (RS M) is associated with the LBT group #1 (e.g., step 2812). At step 2816, the wireless device may determine to use a first LBT type, for example, if the RS M is associated with the LBT group #1. At step 2820, the wireless device may determine to use a second LBT type, for example, if the RS M is not associated with the LBT group #1. The wireless device may determine that the RS M is not associated with LBT beam group #1, for example, based on the configuration parameters indicating that the LBT beam group #1 is associated with RS A, RS B, and RS C. The wireless device may determine that the LBT type for transmission of the second uplink signal is the second LBT type (e.g., as described with respect to FIG. 23), for example, based on the determination that the RS M is not associated with LBT beam group #1. At step 2824, the wireless device may send/transmit the second uplink signal based on the LBT type (e.g., the second LBT type) and the RS M. Using the second LBT type based on the second RS (RS M) not being associated with the LBT group #1 may improve a fairness of transmission opportunities among various communication networks in an unlicensed band (e.g., for shared spectrum channel access).

The wireless device may skip (e.g., drop, cancel, omit, or not transmit) the transmission of the second uplink signal, for example, based on the determination that the RS M is not associated with LBT beam group #1. The second uplink signal may comprise a periodic (or semi-persistent) PUCCH transmission (e.g., a PUCCH transmission for periodic (or semi-persistent) CSI feedback/reporting). The second uplink signal may comprise a periodic (or semi-persistent) SRS or a transmission via aperiodic (or semi-persistent) SRS resource. The second uplink signal may comprise a configured grant (e.g., a semi-persistent-scheduling (SPS)) PUSCH transmission. Skipping of an uplink transmission as described herein may improve a power consumption efficiency of the wireless device and a network resource utilization efficiency (e.g., by reducing an uplink traffic congestion).

The wireless device may determine that the second uplink signal comprises at least one of: a (dynamic) grant-based PUSCH transmission (e.g., scheduled by an uplink DCI); a PUCCH transmission for HARQ-ACK (e.g., in response to a downlink packet, etc.), an aperiodic SRS (resource); a PRACH transmission (e.g., a PDCCH-ordered PRACH transmission, or a contention-free PRACH transmission, etc.); and/or an uplink signal that may not be scheduled for multiple periodic (or semi-persistent) transmissions but may be triggered (e.g., by a base station explicitly indicating the RS M as the spatial domain reference for the uplink signal) for transmission of the uplink signal. The wireless device may determine that the LBT type for transmission of the second uplink signal is the first LBT type (e.g., regardless of determining that the RS M is not associated with LBT beam group #1), for example, based on determining that the second uplink signal is one of the above listed signals. The wireless device may send/transmit the second uplink signal based on the LBT type (e.g., the first LBT type) and the RS M. Using the first LBT type for the above signals may improve a transmission opportunity availability and reduce latency (e.g., within an indicated COT).

The wireless device may determine that the second uplink signal comprises a PRACH transmission (e.g., a contention-based PRACH transmission) or an uplink signal that is pre-defined (or pre-configured) for initializing (e.g., re-setting, re-setup, reconfiguring, reestablishing, updating, changing, reselecting, or managing, etc.) a wireless communication link between a base station and the wireless device. The wireless device may determine that the LBT type for transmission of the second uplink signal is the second LBT type (e.g., regardless of determining whether the RS M is associated with LBT beam group #1), for example, based on the determining that the second uplink signal comprises a PRACH transmission or an uplink signal that is pre-defined for initializing the wireless communication link. The wireless device may send/transmit the second uplink signal based on the LBT type (e.g., the second LBT type) and the RS M. Using the second LBT type may improve fairness of transmission opportunity availability among various communication networks in an unlicensed band (e.g., for shared spectrum channel access).

A wireless device may determine an LBT beam group, for example, based on an implicit indication from the base station. The wireless device may determine the LBT beam group, for example, based on a reference source (e.g., a beam reference, a QCL reference, a QCL source, or a TCI state, etc.) associated with a control channel delivering a first control command (e.g., as an implicit indication method). The control channel may comprise a CORESET of a BWP of a cell. The one or more messages may further comprise one or more parameters for configuring the CORESET and for configuring (e.g., activating, or updating, etc.) the TCI state for the CORESET. The TCI state may comprise an SSB indicator/index. The TCI state may comprise a downlink RS (e.g., a CSI-RS resource, etc.). The first control command may at least comprise a COT duration indicator. The wireless device may receive a parameter of configuring (e.g., activating, updating, or indicating, etc.) a third RS for a third uplink signal. The third RS may be used for determining a spatial domain filter for the third uplink signal (e.g., as described with respect to FIG. 23). The wireless device may determine, based on receiving the first control command, the LBT beam group (e.g., to be used for further determining an LBT type for the third uplink signal) as being the same as the TCI state associated with the CORESET via which the first control command is received. The wireless device may determine an LBT type, for transmission of the third uplink signal, based on whether the LBT beam group (determined as being the same as the TCI state associated with the CORESET) is associated with the third RS. The wireless device may determine the third RS is associated with the LBT beam group. The wireless device may determine that the LBT type for transmission of the third uplink signal is the first LBT type (as described with respect to FIG. 23), for example, based on the determination that the third RS is associated with the LBT beam group. The wireless device may send/transmit the third uplink signal based on the LBT type (e.g., the first LBT type) and the third RS, for example, based on the determination that the third RS is associated with the LBT beam group. The wireless device may determine the third RS is not associated with the LBT beam group. The wireless device may determine that the LBT type for transmission of the third uplink signal is the second LBT type (e.g., as described with respect to FIG. 23), for example, based on the determination that the third RS is not associated with the LBT beam group. The wireless device may send/transmit the third uplink signal based on the LBT type (e.g., the second LBT type) and the third RS, for example, based on the determination that the third RS is not associated with the LBT beam group. The wireless device may skip (e.g., drop, cancel, omit, or not transmit, etc.) the transmission of the third uplink signal, for example, based on the determination that the third RS is not associated with the LBT beam group. Using an implicit indication method (e.g., a wireless device determining whether the LBT beam group is the same as a TCI state associated with a CORESET via which a control command is sent) to determine an LBT type may improve a system operation efficiency by reducing a signaling overhead associated with explicitly indicating an LBT group.

A wireless device may receive (e.g., from a base station or from a second wireless device), one or more messages. The one or more messages may comprise configuration parameters indicating a plurality of LBT beam groups. Each LBT beam group of the plurality of LBT beam groups may be associated with one or more RSs. The wireless device may determine an RS for transmission of an uplink signal (e.g., via a spatial domain filter). The spatial domain filter may be determined based on the RS. The wireless device may receive a control command indicating an LBT beam group of the plurality of LBT beam groups. The wireless device may determine an LBT type for transmission of the uplink signal, for example, based on receiving the control command. The wireless device may determine the LBT type, for example, based on whether the LBT beam group is associated with the RS. The wireless device may send/transmit the uplink signal based on the LBT type and the RS.

The one or more messages may be RRC messages. The one or more messages may be MAC CE messages. The control command may be a MACCE command. The control command may be DCI. The DCI may be group common DCI, where the group common DCI may be transmitted to one or more wireless devices.

The control command may further comprise a COT duration indicator. The determining an LBT type, for transmission of the uplink signal, based on whether the LBT beam group is associated with the RS may comprise determining an LBT type for transmission of the uplink signal within a time duration indicated by the COT duration indicator. The transmitting the uplink signal based on the LBT type and the RS may comprise transmitting the uplink signal, within a time duration based on the COT duration indicator, for example, based on the LBT type and the RS. The control command may further indicate, for a first cell, a first COT duration indicator and a first LBT beam group, and for a second cell, a second COT duration indicator and a second LBT beam group.

The wireless device may further determine that the LBT beam group is a reference source of a control channel. The control command may be sent/transmitted via the control channel. The control channel may comprise a CORESET. The one or more messages may further comprise one or more parameters for configuring the CORESET. The reference source of the control channel may comprise/indicate a TCI state of the CORESET. The one or more messages may further comprise one or more parameters for configuring the TCI state of the CORESET.

An LBT beam group of the plurality of LBT beam groups may comprise a synchronization signal block (SSB) indicator/index. An LBT beam group of the plurality of LBT beam groups may comprise a CSI-RS resource set. An LBT beam group of the plurality of LBT beam groups may comprise a CSI-RS resource.

An RS for transmission of an uplink signal with a spatial domain filter may comprise a downlink RS. The downlink RS may comprise at least one of: a CSI-RS, an SSB, and/or a DMR). An RS for transmission of an uplink signal with a spatial domain filter may comprise an uplink RS. The uplink RS may comprise at least one of: an SRS and/or a DMRS. An RS for transmission of an uplink signal with a spatial domain filter may comprise a TCI state. The TCI state may comprise at least one of: a downlink TCI state, an uplink TCI state, and/or a unified downlink/uplink TCI-state.

The one or more messages may further comprise a parameter for configuring the downlink TCI state associated with a downlink RS and/or channel. The downlink TCI state may comprise/indicate at least one of: an SSB indicator/index, a CSI-RS resource, and an SRS resource. The one or more messages may further comprise a parameter for configuring the uplink TCI state associated to an uplink RS and/or channel. The uplink TCI-state may comprise at least one of: an SSB indicator/index, a CSI-RS resource, and/or an SRS resource. The one or more messages may further comprise a parameter for configuring the unified downlink/uplink TCI state associated to a downlink RS, a downlink channel, an uplink RS, and/or an uplink channel. The unified downlink/uplink TCI state may comprise/indicate at least one of: an SSB indicator/index, a CSI-RS resource, and an SRS resource.

The first LBT type may be an LBT type without random back-off, and the second LBT type may be an LBT type with random back-off. The second LBT type may be an LBT type with random back-off with a contention window of fixed size. The second LBT type may be an LBT type with random back-off with a contention window of variable size.

A wireless device may receive (e.g., from a base station or from a second wireless device) one or more messages. The one or more messages may comprise configuration parameters indicating a CORESET and a TCI state of the CORESET. The wireless device may determine an RS for transmission of an uplink signal (e.g., using a spatial domain filter). The spatial domain filter may be determined based on the RS. The wireless device may receive, via the CORESET, a control command comprising a COT duration indicator. The wireless device may determine, based on receiving the control command, an LBT type for transmission of the uplink signal. The wireless device may determine the LBT type, for example, based on whether the TCI state of the CORESET is associated with the RS. The wireless device may send/transmit the uplink signal, within a time duration based on the COT duration indicator, based on the LBT type and the RS.

A wireless device may receive (e.g., from a base station or from a second wireless device), one or more messages. The one or more messages may comprise configuration parameters indicating a plurality of LBT beam groups. Each LBT beam group of the plurality of LBT beam groups may be associated with one or more RSs. The wireless device may determine an RS for transmission of an uplink signal (e.g., using a spatial domain filter). The spatial domain filter may be determined based on the RS. The wireless device may send/transmit the uplink signal using the spatial domain filter. The wireless device may receive a control command indicating an LBT beam group of the plurality of LBT beam groups. The wireless device may determine that the LBT beam group is not associated with the RS, for example, based on receiving the control command. The wireless device may drop (e.g., skip, cancel, or omit, etc.) transmission of the uplink signal, for example, based on the determining that the LBT beam group is not associated with the RS.

A wireless device may receive (e.g., from a base station or from a second wireless device) one or more messages. The one or more messages may comprise configuration parameters indicating a CORESET and a TCI state of the CORESET. The wireless device may determine an RS for transmission of an uplink signal (e.g., using a spatial domain filter). The spatial domain filter may be determined based on the RS. The wireless device may receive, via the CORESET, a control command. The control command may comprise a COT duration indicator. The wireless device may determine that the TCI state of the CORESET is not associated with the RS, for example, based on receiving the control command. The wireless device may drop (e.g., skip, cancel, or omit, etc.) transmission of the uplink signal within a time duration based on the COT duration indicator, for example, based on the determining that the TCI state of the CORESET is not associated with the RS.

A wireless device may perform a method comprising multiple operations. The wireless device may receive a message indicating a group of one or more reference signals (RSs). The wireless device may determine a listen-before-talk (LBT) procedure type, for transmission of an uplink signal, based on whether the group comprises a reference signal (RS) associated with the uplink signal. The wireless device may transmit, based on the LBT procedure type and a spatial domain filter based on the RS, the uplink signal. The wireless device may also perform one or more additional operations. The wireless device may receive configuration parameters associating a plurality of RSs with a plurality of groups. The plurality of groups comprises the group. The determining the LBT procedure type may comprise determining, based on determining whether the group comprises the RS, whether to use a random back-off. The determining the LBT procedure type may comprise determining, based on determining that the group does not comprise the RS, an LBT procedure type that comprises a random back-off. The LBT procedure type may correspond to an LBT procedure with a contention window of a fixed size or a variable size. The determining the LBT procedure type may comprise determining not to perform an LBT procedure based on determining that the group comprises the RS. The transmitting the uplink signal may comprise transmitting the uplink signal without performing an LBT procedure. The transmitting the uplink signal may comprise transmitting the uplink signal based on performing an LBT procedure corresponding to the determined LBT procedure type. The RS may comprise one of: a synchronization signal/physical broadcast channel block (SSB); a channel state information reference signal (CSI-RS); a sounding reference signal (SRS); or a demodulation reference signal (DMRS). The message may be a medium access control control element (MAC CE) or downlink control information (DCI). The message may further comprise a channel occupancy time (COT) duration indicator. The transmitting the uplink signal based on the LBT type and the spatial domain filter may comprise transmitting the uplink signal, within a time duration indicated by the COT duration indicator. The RS may comprise a downlink RS or an uplink RS. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive a message indicating a beam group. The wireless device may determine a listen-before-transmit (LBT) procedure type, for transmission of an uplink signal, based on whether a transmission beam for the uplink signal is associated with the beam group. The wireless device may transmit, based on the LBT procedure type and via the transmission beam, the uplink signal. The wireless device may also perform one or more additional operations. The beam group may be associated with one or more reference signals (RSs). The transmission beam may be associated with a reference signal. The transmitting the uplink signal via the transmission beam may comprise transmitting the uplink signal using a spatial domain filter based on the RS. The determining the LBT procedure type may comprise determining, based on determining whether the transmission beam is associated with the beam group, whether to use a random back-off. The determining the LBT procedure type may comprise determining, based on determining that the transmission beam is not associated with the beam group, an LBT procedure type that comprises a random back-off. The determining the LBT procedure type may comprise determining not to perform an LBT procedure based on determining that the transmission beam is associated with the beam group. The transmitting the uplink signal may comprise transmitting the uplink signal without performing an LBT procedure. The transmission beam being associated with the beam group may be based on an angular domain area of the beam group comprising an angular domain area of the transmission beam. The wireless device may receive configuration parameters indicating one or more beam groups. The one or more beam groups may comprise the beam group. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive a message indicating a beam group that has been determined to be clear. The wireless device may determine a listen-before-transmit (LBT) procedure type, for transmission of an uplink signal, based on whether a reference signal (RS) for the uplink signal is associated with the beam group. The wireless device may transmit, based on the LBT procedure type and a spatial domain filter based on the RS, the uplink signal. The wireless device may also perform one or more additional operations. The beam group may be associated with one or more reference signals (RSs). The RS may be associated with the beam group if the one or more RSs comprises the RS. The determining the LBT procedure type may comprise determining, based on determining whether the RS is associated with the beam group, whether to use a random back-off. The determining the LBT procedure type may comprise determining, based on determining that the RS is not associated with the beam group, an LBT procedure type that comprises a random back-off. The determining the LBT procedure type comprises determining not to perform an LBT procedure based on determining that the RS is associated with the beam group, and wherein the transmitting the uplink signal comprises transmitting the uplink signal without performing an LBT procedure. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive one or more messages comprising configuration parameters indicating a plurality of listen-before-talk (LBT) beam groups. Each LBT beam group of the plurality of LBT beam groups may be associated with one or more reference signals (RSs). The wireless device may determine an RS for transmission of an uplink signal with a spatial domain filter. The spatial domain filter may be determined based on the RS. The wireless device may receive a message indicating an LBT beam group of the plurality of LBT beam groups. The wireless device may, based on (e.g., in response to) receiving the message, determine an LBT type, for transmission of the uplink signal. The wireless device may determine the LBT type based on whether the LBT beam group is associated with the RS. The wireless device may transmit the uplink signal based on the LBT type and the RS. The wireless device may also perform one or more additional operations. The one or more messages may be radio resource control (RRC) messages or medium access control control element (MAC CE) messages. The message may be a MAC CE command or downlink control information (DCI). The DCI may be group-common DCI transmitted to one or more wireless devices. The message may further comprise a channel occupancy time (COT) duration indicator. The determining an LBT type, for transmission of the uplink signal, based on whether the LBT beam group is associated with the RS may comprises determining an LBT type within a time duration based on the COT duration indicator. The transmitting the uplink signal based on the LBT type and the RS may comprise transmitting the uplink signal within a time duration based on the COT duration indicator. The message may further indicate, for a first cell, a first channel occupancy time (COT) duration indicator and a first LBT beam group, and for a second cell, a second COT duration indicator and a second LBT beam group. The wireless device may determine that an LBT beam group is a reference source of a control channel. The message may be transmitted via the control channel. The control channel may comprise a control resource set (CORESET). The one or more messages may further comprise one or more parameters for configuring the CORESET. The reference source of the control channel may be a transmission configuration indicator (TCI) state of the CORESET. The one or more messages may further comprise one or more parameters for configuring the TCI state of the CORESET. An LBT beam group of the plurality of LBT beam groups may comprise: a synchronization signal block (SSB) index; a channel state information (CSI)-RS resource set; or a CSI-RS resource. The RS may comprise a downlink RS. The downlink RS may comprise at least one of: a channel state information (CSI)-RS resource, a synchronization signal block (SSB) index, or a demodulation RS (DMRS). The RS may comprise an uplink RS. The uplink RS may comprise at least one of: a sounding reference signal (SRS) resource, or a demodulation RS (DMRS). The RS may comprise a TCI state. The TCI state may comprise at least one of: a downlink TCI state, an uplink TCI state, or a unified downlink/uplink TCI state. The one or more messages may further comprise a parameter for configuring the downlink TCI state associated to a downlink RS or channel. The downlink TCI state may comprise at least one of: a synchronization signal block (SSB) index, a channel state information (CSI)-RS resource, or a sounding reference signal (SRS) resource. The one or more messages may further comprise a parameter for configuring the uplink TCI state associated to an uplink RS or channel. The uplink TCI state may comprise at least one of: an SSB index, a CSI-RS resource, or an SRS resource. The one or more messages may further comprise a parameter for configuring the unified downlink/uplink TCI state associated to a downlink RS, a downlink channel, an uplink RS, or an uplink channel. The unified downlink/uplink TCI state may comprise at least one of: an SSB index, a CSI-RS resource, and an SRS resource. The LBT type may be an LBT type without random back-off based on determining that the LBT beam group is associated with the RS. The LBT type may be an LBT type with random back-off based on determining that the LBT beam group is not associated with the RS. The random back-off may comprise a contention window of fixed size or a variable size. The wireless device may perform an LBT procedure based on the LBT type. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive, one or more messages comprising configuration parameters indicating a control resource set (CORESET) and a transmission configuration indicator (TCI) state of the CORESET. The wireless device may determine a reference signal (RS) for transmission of an uplink signal with a spatial domain filter. The spatial domain filter is determined based on the RS. The wireless device may receive, via the CORESET, a message comprising a channel occupancy time (COT) duration indicator. The wireless device may, in response to receiving the message, determine an LBT type, for transmission of the uplink signal, based on whether the TCI state of the CORESET is associated with the RS. The wireless device may transmit the uplink signal, within a time duration based on the COT duration indicator, based on the LBT type and the RS. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive one or more messages comprising configuration parameters indicating a plurality of listen-before-talk (LBT) beam groups. Each LBT beam group of the plurality of LBT beam groups may be associated with one or more reference signals (RSs). The wireless device may determine an RS for transmission of an uplink signal with a spatial domain filter. The spatial domain filter may be determined based on the RS. The wireless device may transmit the uplink signal with the spatial domain filter. The wireless device may receive a message indicating an LBT beam group of the plurality of LBT beam groups. The wireless device may, in response to receiving the message, determine that the LBT beam group is not associated with the RS. The wireless device may drop transmission of the uplink signal based on determining that the LBT beam group is not associated with the RS. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive one or more messages comprising configuration parameters indicating a control resource set (CORESET) and a transmission configuration indicator (TCI) state of the CORESET. The wireless device may determine a reference signal (RS) for transmission of an uplink signal with a spatial domain filter. The spatial domain filter may be determined based on the RS. The wireless device may transmit the uplink signal with the spatial domain filter. The wireless device may receive a message, via the CORESET, comprising a channel occupancy time (COT) duration indicator. The wireless device may, in response to receiving the message, determine that the TCI state of the CORESET is not associated with the RS. The wireless device may drop transmission of the uplink signal within a time duration based on the COT duration indicator, for example, based on determining that the TCI state of the CORESET is not associated with the RS. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive a message indicating a group of first one or more reference signals (RSs). The wireless device may select, a listen-before-talk (LBT) type for transmission of an uplink signal, based on whether the group comprises a second RS associated with a spatial domain filter for transmission of the uplink signal. The wireless device may transmit, based on the LBT type, the uplink signal. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

A wireless device may perform a method comprising multiple operations. The wireless device may receive a message indicating a group of one or more reference signals (RSs). The wireless device may determine, a listen-before-talk (LBT) type for transmission of an uplink signal, based on whether the group comprises an RS associated with a spatial domain filter of the uplink signal. The wireless device may transmit, based on the LBT type, the uplink signal. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the message. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, a message indicating a group of one or more reference signals (RSs);
   performing a listen-before-talk (LBT) procedure associated with transmission of an uplink signal, wherein a type of the LBT procedure is based on whether the group of one or more RSs comprises a reference signal (RS) associated with transmission of the uplink signal; and
   transmitting, based on the RS associated with transmission of the uplink signal, the uplink signal.

2. The method of claim 1, wherein, based on the group of one or more RSs comprising the RS associated with transmission of the uplink signal, the type of the LBT procedure is a type without a random back-off.

3. The method of claim 1, wherein, based on the group of one or more RSs not comprising the RS associated with transmission of the uplink signal, the type of the LBT procedure is a type with a random back-off.

4. The method of claim 1, further comprising:
   based on the group of one or more RSs comprising a second RS associated with transmission of a second uplink signal, not performing, for transmission of a second uplink signal, an LBT procedure; and
   transmitting, based on the second RS associated with transmission of the second uplink signal, the second uplink signal.

5. The method of claim 1, wherein the transmitting, based on the RS associated with transmission of the uplink signal, the uplink signal comprises transmitting the uplink signal based on a spatial domain filter based on the RS.

6. The method of claim 1, further comprising receiving configuration parameters associating a plurality of RSs with a plurality of groups of RSs, wherein the plurality of groups of RSs comprises the group of one or more RSs.

7. The method of claim 1, wherein the RS comprises one of:
   a synchronization signal/physical broadcast channel block (SSB);
   a channel state information reference signal (CSI-RS);
   a sounding reference signal (SRS); or
   a demodulation reference signal (DMRS).

8. The method of claim 1, further comprising determining the RS associated with transmission of the uplink signal.

9. The method of claim 1, wherein the transmitting the uplink signal is further based on a transmission beam associated with the RS.

10. A method comprising:
    receiving, via a control resource set (CORESET), a message indicating a channel occupancy time (COT);
    performing a listen-before-talk (LBT) procedure associated with transmission of an uplink signal, wherein a type of the LBT procedure is based on whether a transmission configuration indication (TCI) state of the CORESET is associated with a reference signal (RS) associated with transmission of the uplink signal; and
    transmitting, based on the RS associated with transmission of the uplink signal, the uplink signal.

11. The method of claim 10, wherein the TCI state of the CORESET corresponds to a group of one or more RSs.

12. The method of claim 10, wherein, based on the TCI state of the CORESET being associated with the RS associated with transmission of the uplink signal, the type of the LBT procedure is a type without a random back-off.

13. The method of claim 10, wherein, based on the TCI state of the CORESET not being associated with the RS associated with transmission of the uplink signal, the type of the LBT procedure is a type with a random back-off.

14. The method of claim 10, wherein the transmitting, based on the RS associated with transmission of the uplink signal, the uplink signal comprises transmitting the uplink signal based on a spatial domain filter based on the RS.

15. The method of claim 10, wherein the RS comprises one of:
    a synchronization signal/physical broadcast channel block (SSB);
    a channel state information reference signal (CSI-RS);
    a sounding reference signal (SRS); or
    a demodulation reference signal (DMRS).

16. The method of claim 10, further comprising determining the RS associated with transmission of the uplink signal.

17. The method of claim 10, wherein the transmitting the uplink signal is further based on a transmission beam associated with the RS.

18. A method comprising:
    sending, by a base station to a wireless device, a message indicating a group of one or more reference signals (RSs); and
    receiving, after a listen-before-talk (LBT) procedure used by the wireless device and based on a reference signal (RS), an uplink signal, wherein a type of the LBT procedure is based on whether the group of one or more RSs comprises the RS.

19. The method of claim 18, wherein, based on the group of one or more RSs comprising the RS, the type of the LBT procedure is a type that does not comprise a random back-off.

20. The method of claim 18, wherein, based on the group of one or more RSs not comprising the RS, the type of the LBT procedure is a type that comprises a random back-off.

21. The method of claim 18, further comprising:
receiving, based on a second RS, a second uplink signal, wherein the second uplink signal is sent without performing an LBT procedure based on the group of one or more RSs not comprising the second RS.

22. The method of claim 18, wherein the uplink signal is transmitted based on a spatial domain filter based on the RS.

23. The method of claim 18, further comprising sending configuration parameters associating a plurality of RSs with a plurality of groups of RSs, wherein the plurality of groups of RSs comprises the group of one or more RSs.

24. The method of claim 18, wherein the RS comprises one of:
a synchronization signal/physical broadcast channel block (SSB);
a channel state information reference signal (CSI-RS);
a sounding reference signal (SRS); or
a demodulation reference signal (DMRS).

25. The method of claim 18, wherein the uplink signal is transmitted based on a transmission beam associated with the RS.

26. A method comprising:
sending, by a base station to a wireless device via a control resource set (CORESET), a message indicating a channel occupancy time (COT); and
receiving, after a listen-before-talk (LBT) procedure used by the wireless device and based on a reference signal (RS), an uplink signal, wherein a type of the LBT procedure is based on whether a transmission configuration indication (TCI) state of the CORESET is associated with the RS.

27. The method of claim 26, wherein the TCI state of the CORESET corresponds to a group of one or more RSs.

28. The method of claim 26, wherein, based on the TCI state of the CORESET being associated with the RS, the type of the LBT procedure is a type that does not comprise a random back-off.

29. The method of claim 26, wherein, based on the TCI state of the CORESET not being associated with the RS, the type of the LBT procedure is a type that comprises a random back-off.

30. The method of claim 26, wherein the uplink signal is transmitted based on a spatial domain filter based on the RS.

31. The method of claim 26, wherein the RS comprises one of:
a synchronization signal/physical broadcast channel block (SSB);
a channel state information reference signal (CSI-RS);
a sounding reference signal (SRS); or
a demodulation reference signal (DMRS).

32. The method of claim 26, wherein the uplink signal is transmitted based on a transmission beam associated with the RS.

33. A wireless device comprising:
one or more processors; and
memory storing instructions that, when executed by the one or more processors, cause the wireless device to:
receive a message indicating a group of one or more reference signals (RSs);
perform a listen-before-talk (LBT) procedure associated with transmission of an uplink signal, wherein a type of the LBT procedure is based on whether the group of one or more RSs comprises a reference signal (RS) associated with transmission of the uplink signal; and
transmit, based on the RS associated with transmission of the uplink signal, the uplink signal.

34. The wireless device of claim 33, wherein:
based on the group of one or more RSs comprising the RS associated with transmission of the uplink signal, the type of the LBT procedure is a type without a random back-off, or
based on the group of one or more RSs not comprising the RS associated with transmission of the uplink signal, the type of the LBT procedure is a type with a random back-off.

35. The wireless device of claim 33, wherein the instructions, when executed by the one or more processors, cause the wireless device to:
based on the group of one or more RSs comprising a second RS associated with transmission of a second uplink signal, not perform, for transmission of a second uplink signal, an LBT procedure; and
transmit, based on the second RS associated with transmission of the second uplink signal, the second uplink signal.

36. A non-transitory computer readable medium storing instructions that, when executed, cause:
receiving, by a wireless device, a message indicating a group of one or more reference signals (RSs);
performing a listen-before-talk (LBT) procedure associated with transmission of an uplink signal, wherein a type of the LBT procedure is based on whether the group of one or more RSs comprises a reference signal (RS) associated with transmission of the uplink signal; and
transmitting, based on the RS associated with transmission of the uplink signal, the uplink signal.

37. The non-transitory computer readable medium of claim 36, wherein:
based on the group of one or more RSs comprising the RS associated with transmission of the uplink signal, the type of the LBT procedure is a type without a random back-off, or
based on the group of one or more RSs not comprising the RS associated with transmission of the uplink signal, the type of the LBT procedure is a type with a random back-off.

38. The non-transitory computer readable medium of claim 36, wherein the instructions, when executed, cause:
based on the group of one or more RSs comprising a second RS associated with transmission of a second uplink signal, not performing, for transmission of a second uplink signal, an LBT procedure; and
transmitting, based on the second RS associated with transmission of the second uplink signal, the second uplink signal.

39. A wireless device comprising:
one or more processors; and
memory storing instructions that, when executed by the one or more processors, cause the wireless device to:
receive, via a control resource set (CORESET), a message indicating a channel occupancy time (COT);
perform a listen-before-talk (LBT) procedure associated with transmission of an uplink signal, wherein a type of the LBT procedure is based on whether a transmission configuration indication (TCI) state of the CORESET is associated with a reference signal (RS) associated with transmission of the uplink signal; and transmit, based on the RS associated with transmission of the uplink signal, the uplink signal.

40. The wireless device of claim 39, wherein the TCI state of the CORESET corresponds to a group of one or more RSs.

41. The wireless device of claim 39, wherein:
based on the TCI state of the CORESET being associated with the RS associated with transmission of the uplink signal, the type of the LBT procedure is a type without a random back-off, or
based on the TCI state of the CORESET not being associated with the RS associated with transmission of the uplink signal, the type of the LBT procedure is a type with a random back-off.

42. A non-transitory computer readable medium storing instructions that, when executed, cause:
receiving, by a wireless device via a control resource set (CORESET), a message indicating a channel occupancy time (COT);
performing a listen-before-talk (LBT) procedure associated with transmission of an uplink signal, wherein a type of the LBT procedure is based on whether a transmission configuration indication (TCI) state of the CORESET is associated with a reference signal (RS) associated with transmission of the uplink signal; and
transmitting, based on the RS associated with transmission of the uplink signal, the uplink signal.

43. The non-transitory computer readable medium of claim 42, wherein the TCI state of the CORESET corresponds to a group of one or more RSs.

44. The non-transitory computer readable medium of claim 42, wherein:
based on the TCI state of the CORESET being associated with the RS associated with transmission of the uplink signal, the type of the LBT procedure is a type without a random back-off, or
based on the TCI state of the CORESET not being associated with the RS associated with transmission of the uplink signal, the type of the LBT procedure is a type with a random back-off.

* * * * *